United States Patent [19]
Tiedge

[11] Patent Number: 5,915,774
[45] Date of Patent: Jun. 29, 1999

[54] SELF-ALIGNING SYSTEM TO ADJUST OCCUPANCY SPACE IN A VEHICLE

[75] Inventor: Robert L. Tiedge, Cicero, Ind.

[73] Assignee: Kwikee Products Co, Inc., Cottage Grove, Oreg.

[21] Appl. No.: 08/725,208

[22] Filed: Sep. 24, 1996

Related U.S. Application Data

[63] Continuation-in-part of application No. 08/585,163, Jan. 11, 1996, Pat. No. 5,829,822, and application No. 08/584,060, Jan. 11, 1996, Pat. No. 5,800,002.

[51] Int. Cl.[6] .................................................. B60P 3/34
[52] U.S. Cl. ........................................ 296/26.13; 296/175
[58] Field of Search ............................. 296/26, 156, 164, 296/165, 171, 172, 173, 175, 176, 26.09, 26.1, 26.13, 26.14; 52/67

[56] References Cited

U.S. PATENT DOCUMENTS

| | | | |
|---|---|---|---|
| 2,013,890 | 9/1935 | Kuns .......................................... 267/242 |
| 2,757,418 | 8/1956 | Bergstrom .................................... 52/67 |
| 2,822,100 | 2/1958 | Pesta .......................................... 414/461 |
| 2,886,856 | 5/1959 | Suk Kun Che ............................. 52/69 |
| 2,898,143 | 8/1959 | Ferrera ...................................... 296/171 |
| 2,906,556 | 9/1959 | Cantele et al. ............................. 296/26 |
| 3,157,427 | 11/1964 | Reynolds ................................. 296/168 |
| 3,212,810 | 10/1965 | Bass ........................................ 296/171 |
| 3,300,914 | 1/1967 | Stewart et al. ............................... 52/67 |
| 3,494,655 | 2/1970 | Linton ..................................... 296/168 |
| 3,506,300 | 4/1970 | Remmert .................................. 296/171 |
| 3,574,388 | 4/1971 | Stone ...................................... 296/168 |
| 3,740,088 | 6/1973 | Ratcliff .................................... 296/171 |
| 3,913,934 | 10/1975 | Koehn et al. ............................ 280/656 |
| 3,924,889 | 12/1975 | Gogush .................................... 296/176 |
| 3,931,895 | 1/1976 | Grimaldo ................................. 414/678 |
| 4,128,269 | 12/1978 | Stewart .................................... 296/171 |
| 4,299,421 | 11/1981 | Bontrager ................................... 296/27 |
| 4,475,761 | 10/1984 | Milroy et al. .............................. 296/61 |
| 4,488,752 | 12/1984 | Broussard ................................ 296/171 |
| 4,500,132 | 2/1985 | Yoder ...................................... 296/171 |
| 4,869,030 | 9/1989 | Clark ........................................ 52/79.6 |
| 4,940,277 | 7/1990 | Buell ....................................... 296/164 |
| 4,943,106 | 7/1990 | Hunt ......................................... 296/26 |
| 4,960,299 | 10/1990 | Steadman ................................. 296/26 |
| 5,017,081 | 5/1991 | Helton ..................................... 414/470 |
| 5,050,927 | 9/1991 | Montanari ............................... 296/165 |
| 5,069,471 | 12/1991 | Van Der Linden et al. ......... 280/414.1 |
| 5,127,697 | 7/1992 | St. Marie .................................. 296/26 |
| 5,237,782 | 8/1993 | Cooper ....................................... 52/67 |
| 5,249,823 | 10/1993 | McCoy et al. ........................... 280/656 |
| 5,295,430 | 3/1994 | Dewald, Jr. et al. ................. 92/165 R |
| 5,332,276 | 7/1994 | Blodgett, Jr. .............................. 296/26 |
| 5,333,420 | 8/1994 | Eden .......................................... 52/67 |
| 5,445,236 | 8/1995 | Kuhn ...................................... 180/14.1 |
| 5,491,933 | 2/1996 | Miller et al. ............................... 52/67 |
| 5,586,802 | 12/1996 | Dewald, Jr. et al. .............. 296/171 X |

*Primary Examiner*—Andrew C. Pike
*Attorney, Agent, or Firm*—Christensen O'Connor Johnson & Kindness

[57] ABSTRACT

A system varies space of a vehicle having a first portion with occupiable space and a number of ground engaging wheels coupled to the first portion. A second occupiable portion is coupled to the first portion and configured to move relative thereto to adjust volume of an occupiable living space defined by both portions. A pair of support arms are coupled to the first portion which each have a bearing member engaging a guide of the second portion. Each bearing member is permitted to move relative to an axis perpendicular to an axis of travel of the second portion to relieve stress from forces acting on the system which are nonparallel to the axis of travel. The arms are positioned by an operator controlled positioning mechanism. In another system, an arrangement of telescoping arms is disclosed for positioning a first occupiable portion relative to a second occupiable portion. This arrangement includes an operator positioning mechanism with a rotatable member formed from a self-lubricating polymeric material. The rotatable member is configured to movably engage at least one arm and correspondingly position the first portion relative to the second portion to adjust volume of an occupiable living space defined by the first and second portions.

20 Claims, 16 Drawing Sheets

SELF-ALIGNING SYSTEM TO ADJUST OCCUPANCY SPACE IN A VEHICLE

This application is a continuation-in-part of U.S. Ser. No. 08/585,163, filed on Jan. 11, 1996 entitled LATCH FOR, RECONFIGURABLE HOUSING, now U.S. Pat. No. 5,829,822 and is a continuation-in-part of U.S. patent application Ser. No. 08/584,060, filed Jan. 11, 1996, now U.S. Pat. No. 5,800,002.

BACKGROUND OF THE INVENTION

The present invention relates to a system for variably sizing a living space, and more particularly a reconfigurable living space system for a vehicle.

Recreational vehicles enjoy widespread popularity because they enable their owners to travel away from home for extended periods while enjoying many of the comforts of home. One persistent limitation of such vehicles is that their interior spaces are somewhat small and cramped compared to a normal living space. While many factors contribute to this design limitation, a major contributor is the relatively narrow width of the normal street or highway. The need to travel within the confines of a normal highway traffic lane sets an upper limit on the feasible width of a recreational vehicle. Because this upper width limit is much smaller than the width of even a small room in a normal house, the interior of a typical recreational vehicle seems cramped by familiar comparison.

One ingenious solution to this problem is the incorporation of an expandable room into a recreational vehicle such as a motor home or a trailer. This feature has found application in other types of trailers and vehicles having occupiable space.

U.S. Pat. No. 4,960,299 to Steadman shows a trailer with an expandable living space provided, in part, by folding walls which pivot to a position against the side of the trailer when not in an expanded configuration. U.S. Pat. No. 2,898,143 to Ferrera shows a trailer with movable telescoping walls and a foldable floor which combine to provide an expandable living space. U.S. Pat. No. 2,906,556 to Cantele et al. also shows an expandable trailer with a folding floor. This existing system uses pivoting walls to expand the sides and a telescoping wall in the rear. Unfortunately, the folding walls and floors of these systems complicate the expansion process. Necessarily, these designs do not permit one to continuously occupy the expandable section of the vehicle in both the expanded and unexpanded positions.

Consequently, slide out rooms have been developed which are continuously occupiable in both the expanded and unexpanded positions. Quite often, these rooms are configured to emerge along an outer side wall of the vehicle when expanded. U.S. Pat. No. 5,295,430 to Dewald, Jr., et al. discusses slide out rooms and discloses a number of telescoping tubular supports connected to the underside of the vehicle to laterally move the slide out room between the expanded and unexpanded positions. These supports also must be configured to bear the load of the room in the expanded position. Ideally, such load bearing function is performed without the need for ground engaging supports other than those required for the vehicle in the unexpanded position.

One drawback with telescoping tubular support systems is the unacceptable frequency of binding between the slide out room and the fixed portion of the vehicle during movement. Typically, such binding results when relative movement between multiple supports is not properly synchronized. One system attempts to address this problem by adding a number of pulleys and cables to control motion between different telescopic supports. Unfortunately, these additions often increase complexity of the slide out room system and generally increase costs relating to the manufacture and maintenance of the vehicle. Thus, there remains a need for a reliable system to move and support an expandable portion of a vehicle that resists binding, requires minimal maintenance, and reduces relative cost.

SUMMARY OF THE INVENTION

The present invention relates to systems for varying size of a living space and associated mechanisms. While the actual nature of the invention covered herein can only be determined with reference to the claims appended hereto, certain features which are characteristic of the preferred embodiment of the novel systems disclosed herein can be described briefly.

One feature of the present invention is a system for varying space in a vehicle that has an occupiable first section and an occupiable second section coupled to the first section. The second section moves along a first axis from a first to a second position relative to the first section to adjust volume of an occupiable living space. The second section is occupiable in both positions and includes a guide. A pair of load bearing arms are coupled to the first section and configured to support the second section. At least one of the arms includes a bearing portion engaging the guide to move the second section between the first and second positions. The guide is configured to permit the bearing portion to move relative to a second axis in response to a force component acting perpendicular to the first axis when the second section is moved. The second axis is generally perpendicular to the first axis. An operator controlled actuator operatively coupled to the arms selectively positions the arms and correspondingly positions the second section relative to the first section.

Another feature of the present invention is a system for varying space in a vehicle that has a first support arm with a tube fixed to a first occupiable portion and a movable section at least partially nested within the tube that telescopically moves relative thereto. The movable section engages a second occupiable portion of the vehicle in a load bearing relationship. A second support arm is included which is coupled to the first portion and configured to movably engage the second portion. Also included is an operator controlled positioning mechanism that has a first rotatable member formed from a self-lubricating polymeric material that rotates about a second axis approximately perpendicular to the first axis and engages the movable section of the first arm to selectively position the second portion along the first axis in relation to the first portion.

One object of the present invention is to provide a multi-arm support system for moving the expandable section of a vehicle.

Another object is to reduce binding, increase adjustment speed, and improve efficiency of a system for adjusting the volume of a living space that has fixed and expandable portions.

Yet another object of the present invention is to provide an expandable room system which generally does not require grease or oil lubrication of various sliding surfaces.

Further objects and features of the present invention will be made apparent from the drawings and description contained herein.

DESCRIPTION OF THE PREFERRED EMBODIMENT

Figure 1:
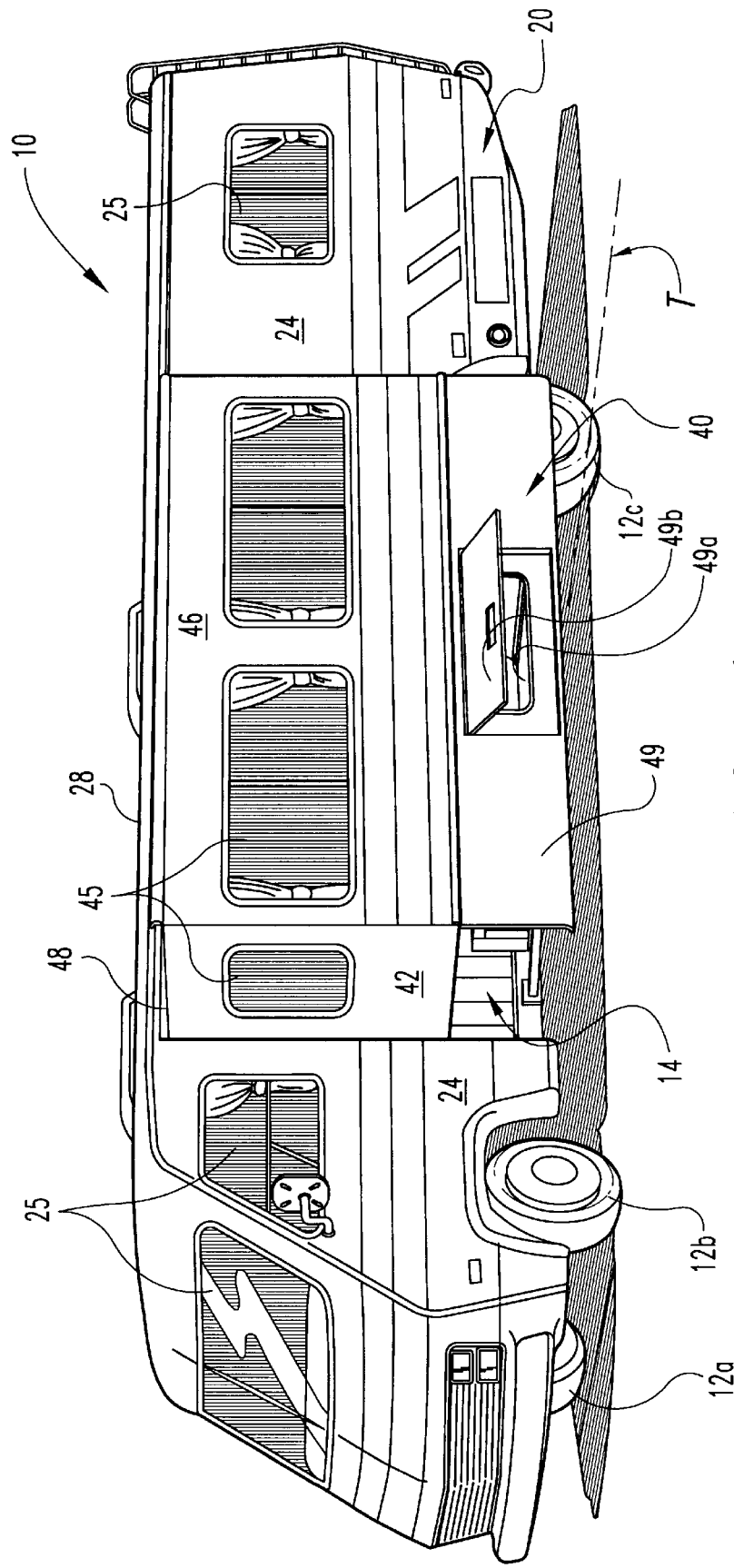
FIG. 1 is perspective view of a vehicle of one preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

Figure 2:
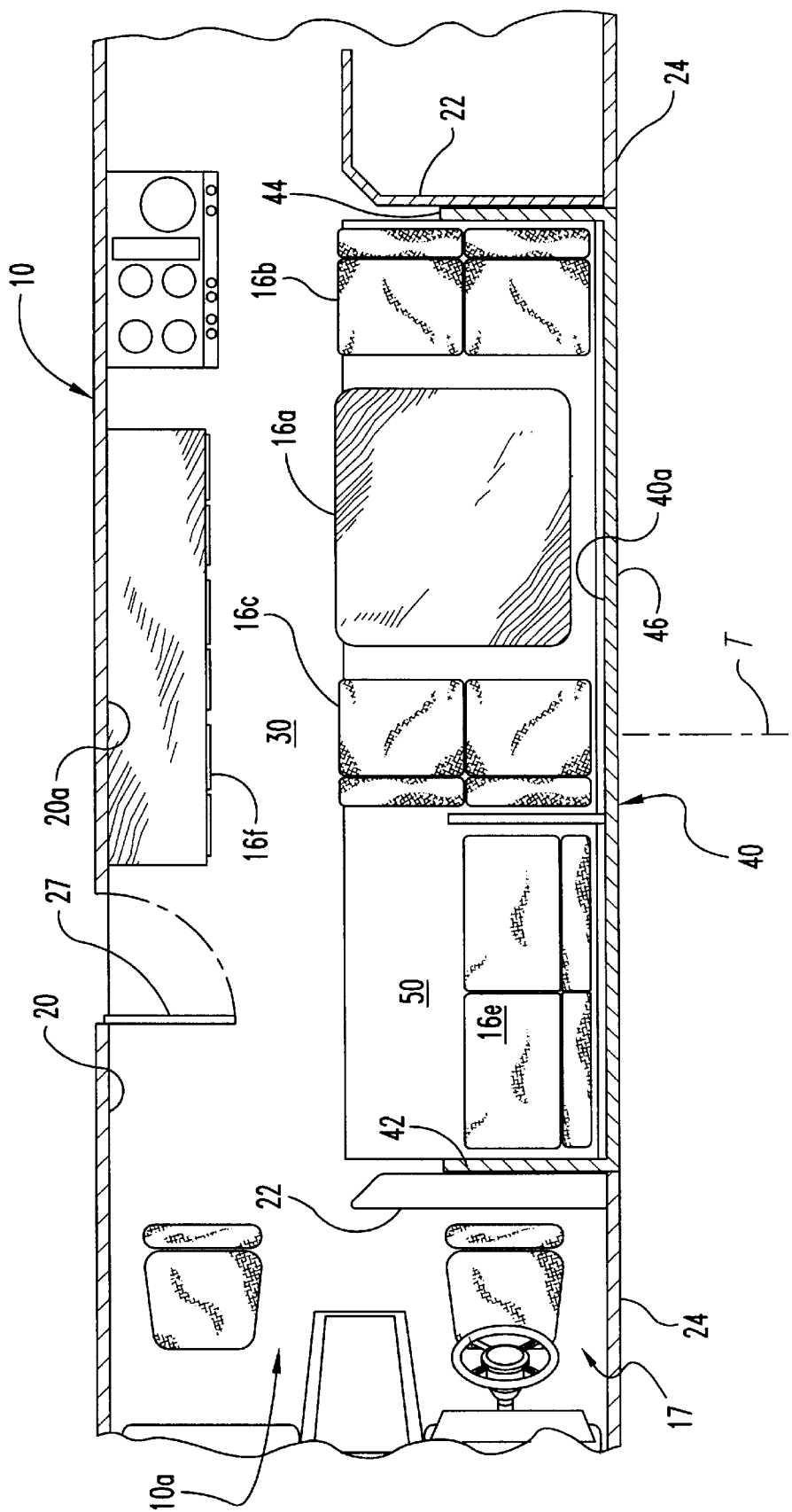
FIG. 2 is a diagrammatic partial cross-sectional view of the vehicle shown in FIG. 1.

FIGS. 1 and 2 depict vehicle 10 of one preferred embodiment of the present invention. Vehicle 10 has a number of ground engaging wheels 12a, 12b, 12c; a fixed section 20; and an expandable section 40. Vehicle 10 also includes a compartment 14 for housing a means to move and support expandable section 40 relative to fixed section 20. Fixed section 20 includes internal walls 22 and external wall 24. Fixed section 20 further includes roof 28 and floor 30 generally opposing one another. Collectively, the structures of fixed section 20 define a fixed section living space 20a.

Expandable section 40 includes opposing walls 42, 44 and outer wall 46. Opposing walls 42, 44 and outer wall 46 are joined to roof 48. Roof 48 opposes floor 50. Floor 50 is correspondingly joined to opposing walls 42, 44 and outer wall 46. Opposing wall 42 includes a window 45. Outer wall 46 includes a window 45 and a skirt portion 49. Skirt portion 49 has a storage compartment or bin 49a for the storage of miscellaneous items. Bin 49a has an access door 49b for access from the exterior or outside of vehicle 10. Expandable section 40 defines an occupiable living space 40a.

Vehicle 10 defines an interior living space 10a comprising fixed section living space 20a and expandable section living space 40a. Vehicle 10 has windows 25 and door 27 and includes furnishing 16a, 16b, 16c, 16e, and 16f configured in the conventional manner for a motor home. Vehicle 10 is also motorized in the conventional manner and includes driving compartment 17 configured in a way common to motor homes and the like.

Expandable section 40 is configured to move relative to fixed section 20 along an axis T. This movement facilitates selective adjustment of expandable section 40 between the expanded position shown in FIG. 1 and the unexpanded position shown in FIG. 2. In the unexpanded position, outer wall 46 is generally flush with external wall 24. Unlike many existing systems, the expandable section 40 may be occupied in the unexpanded as well as expanded positions. Similarly, the fixed section 20 is occupiable whether the expandable section 40 is expanded or unexpanded.

Figure 3:
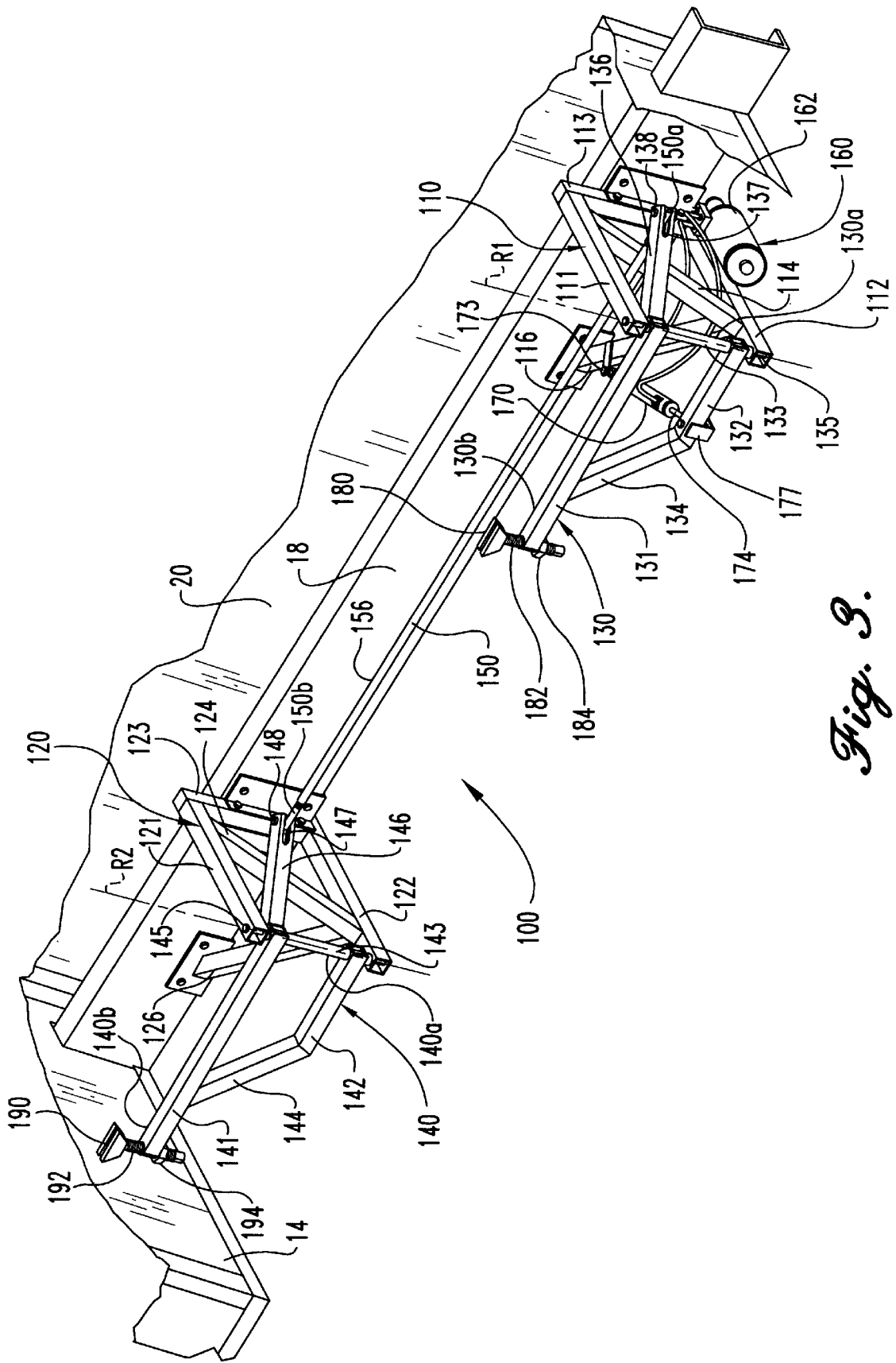
FIG. 3 is a partial side perspective view of a carriage for the preferred embodiment of FIG. 1.
Figure 4:
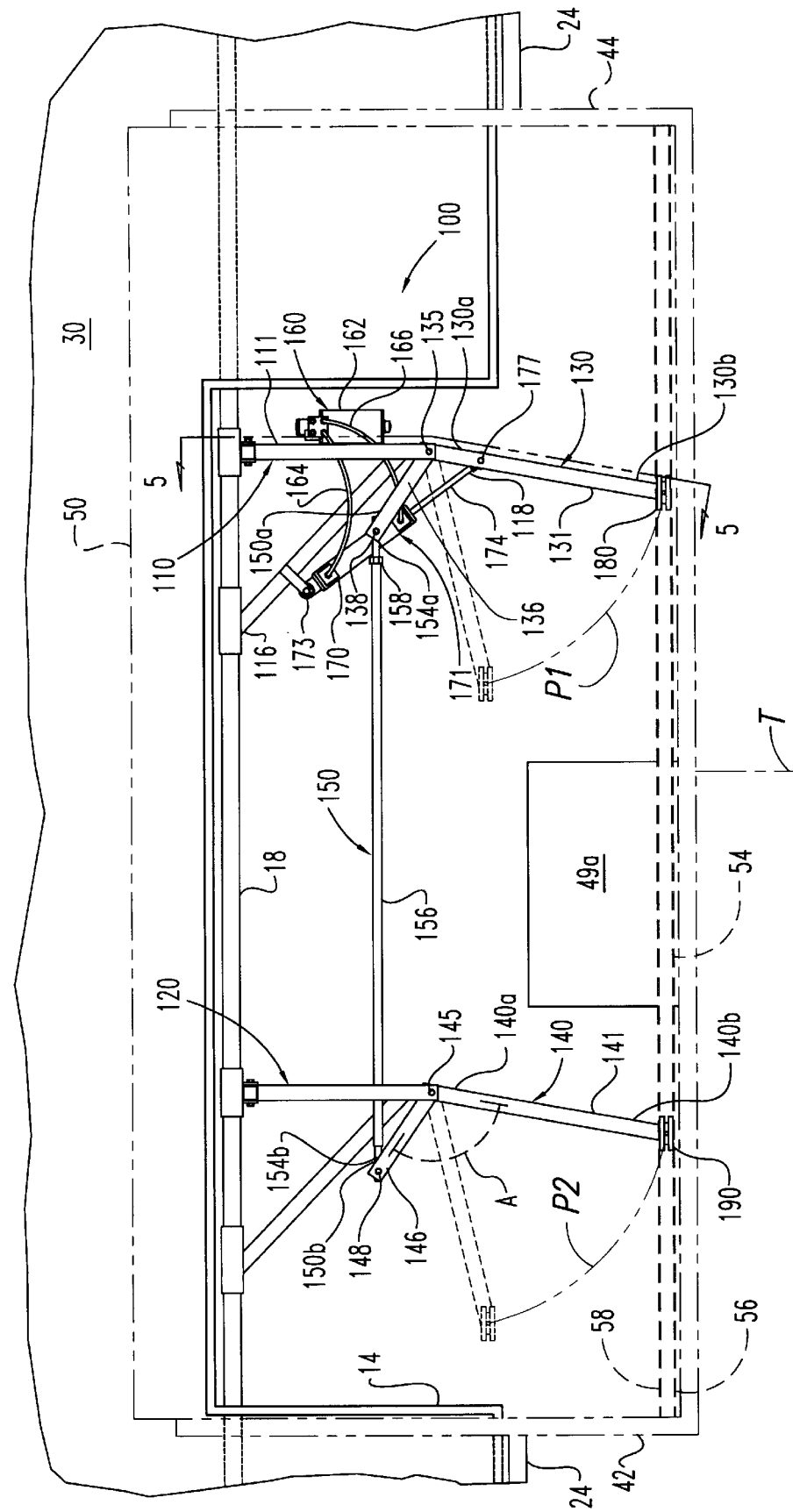
FIG. 4 is a top plan view of the carriage shown in FIG. 3.
Figure 5:
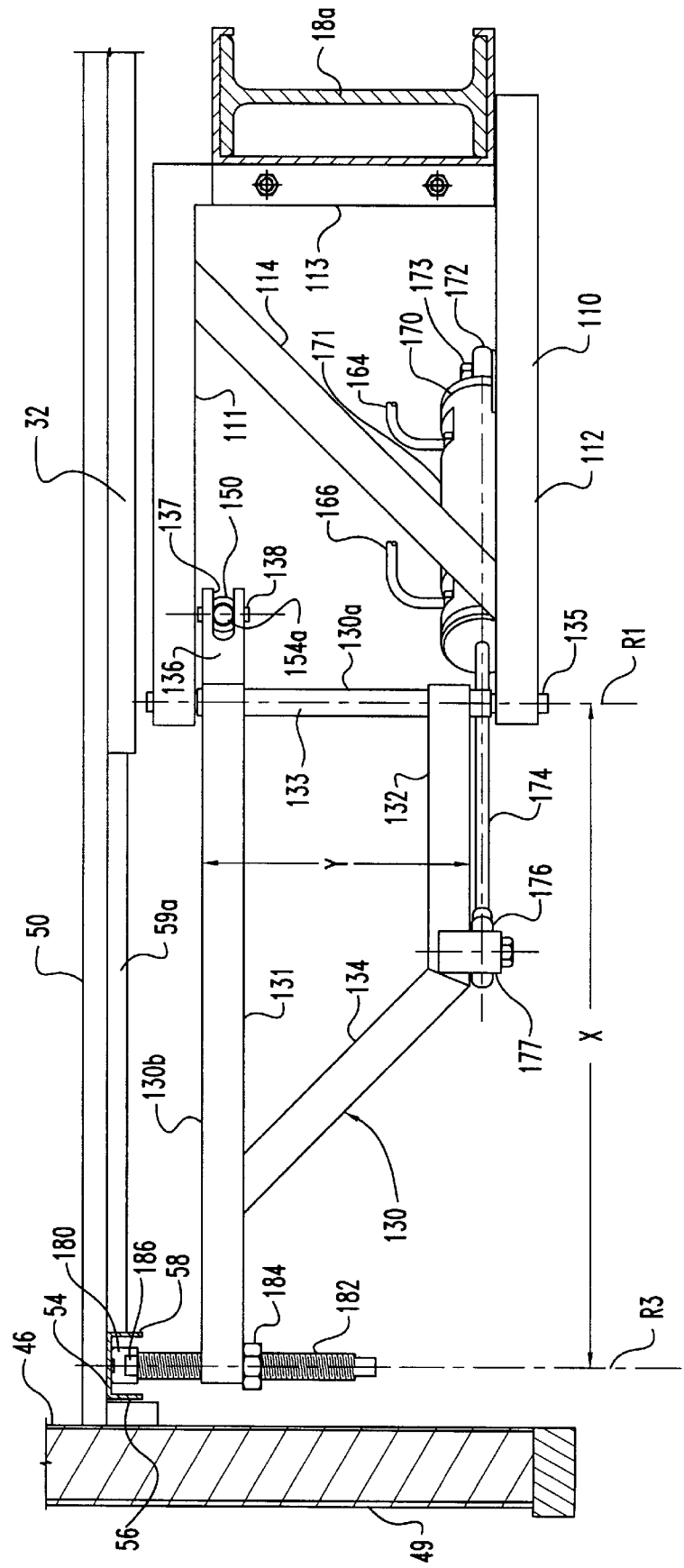
FIG. 5 is a partial cross-sectional elevational view taken along line 5—5 of FIG. 4.

FIGS. 3–5 illustrate a carriage 100 for moving and supporting expandable section 40 relative to fixed section 20. Expandable section 40 is not shown for clarity in FIG. 3. Similarly, expandable section 40 is only shown partially in FIGS. 4 and 5. Carriage 100 includes anchor brackets 110, 120 rigidly attached to fixed section 20 of vehicle 10. In FIGS. 3 and 4, brackets 110, 120 are attached to a C-shaped vehicle frame member 18. In FIG. 5, bracket 110 is shown attached to an I-shaped vehicle frame member 18a. In either case, bolted attachment plates are illustrated as the means of rigid attachment. Alternatively, welding or some other conventional attachment means may be used.

Notably, neither bracket 110, 120 passes through the vehicle frame and thereby avoids significantly compromising structural integrity of the vehicle chassis. Each bracket 110, 120 has a generally horizontal top member 111, 121 and a bottom member 112, 122 joined by generally vertical members 113, 123 and gusset members 114, 124. Each bracket 110, 120 also includes angle brace 116, 126. Brackets 110, 120 are each coupled to frame 18 along vertical member 113, 123 and with angle brace 116, 126. As more clearly seen in FIG. 5, bottom members 112, 122 have a portion which extends under frame 18 or 18a to provide better load bearing support.

Load bearing arms 130, 140 are pivotably anchored to brackets 110, 120, and are correspondingly pivotally connected or attached to fixed portion 20 of vehicle 10. Each arm 130, 140 has an anchor portion 130a, 140a opposing a bearing portion 130b, 140b. Anchor portions 130a, 140a and bearing portions 130b, 140b are integrally and rigidly connected to each other. Arms 130, 140 include generally horizontal elongated top members 131, 141 and support members 132, 142 connected by gusset 134, 144. Generally, vertical tubes 133, 143 are positioned between top members 131, 141 and support members 132, 142 and slightly protrude through a bore in each. For each arm 130, 140, a corresponding bearing pin 135, 145 passes through top member 131, 141; tube 133, 143; and support member 132, 142. Each bearing pin 135, 145 is fastened to a bracket 110, 120, respectively.

Bearing pins 135, 145 each lie along a generally vertical rotational axis R1, R2. Arms 130, 140; tubes 133, 143; and bearing pins 135, 145 are configured so that each arm 130, 140 rotates about axis R1, R2, respectively.

Arms 130, 140 are also each configured to include an oblique portion 136, 146. Oblique portion 136, 146 is positioned at an oblique angle with respect to a longitudinal axis along top members 131, 141. Oblique angle A is illustrated in FIG. 4 for arm 140. Preferably this angle is in a range of about 100 to 130 degrees. More preferably, the angle is in a range of about 110 to 120 degrees. Most preferably, the angle is about 115 degrees.

Rod 150 is pivotally connected to each oblique portion 136, 146. Each oblique portion 136, 146 defines a cavity 137, 147 configured to form a clevis connection in conjunction with pins 138, 148 to pivotally connect to opposing ends 150a, 150b of rod 150. When so connected, rod 150 spans a distance between arms 130, 140 and pivotably couples arms 130, 140 together. Rod 150 further includes opposing mounting sections 154a, 154b corresponding to each end 150a, 150b. Also, rod 150 has an elongated turnbuckle segment 156 threadingly engaging each mounting section 154a, 154b. Mounting segments 154a, 154b and turnbuckle segment 156 are configured so that rotation of turnbuckle segment 156 about its longitudinal axis provides a turnbuckle function to adjust the effective length of rod 150. In turn, this adjustment controls the relative spacing of arms 130, 140 coupled to rod 150. Stopping nut 158 threadingly engages mounting segment 158a of rod 150 at the interface with turnbuckle segment 156 to prevent unwanted rotation of turnbuckle segment 156 once adjustment has been accomplished. Stopping nut 158 may be turned about mounting segment 154a relative to turnbuckle segment 156 to allow readjustment as needed.

In one preferred embodiment, each bracket 110, 120 and arm 130, 140 is manufactured from metal tubes using conventional joining methods. In other embodiments, different shapes or materials may be used as would occur to one skilled in the art.

Next, actuation system 160 for carriage 100 is discussed. Actuation system 160 includes an operator controlled hydraulic pump 162 coupled to a double acting hydraulic cylinder 170. Both pump 162 and cylinder 170 are of a conventional type. Coupling between the pump 162 and hydraulic cylinder 170 is accomplished by fluid conduits 164, 166. Pump 162 may also service other actuation systems for vehicle 10. Hydraulic cylinder 170 includes a body 171 and a mounting ear 172 pivotably mounted to angle brace 116 by fastener 173. Hydraulic cylinder also has a plunger 174 with a mounting portion 176 pivotably mounted to support member 132 by fastener 177.

Each arm 130, 140 includes a slide block 180, 190 on a spindle 182, 192 threadingly engaging a threaded bore in each bearing portion 130b, 140b. The height of each slide block 180, 190 is adjusted relative to arm 130, 140 by turning spindle 182, 192 to advance it up or down with respect to bearing portion 130b, 140b, and locking spindle 182, 192 in place with stopper nut 184, 194. As illustrated in FIG. 5, spindle 182 has an end 186 that is preferably not threaded which engages a recess in each slide block 180. It being understood that spindle 192 and slide block 190 are similarly configured (not shown). Each slide block rests on spindle 182, 192 to pivot about an axis along the length of each spindle 182, 192. This rotational axis for spindle 182 is shown as axis R3 in FIG. 5.

Figure 7:
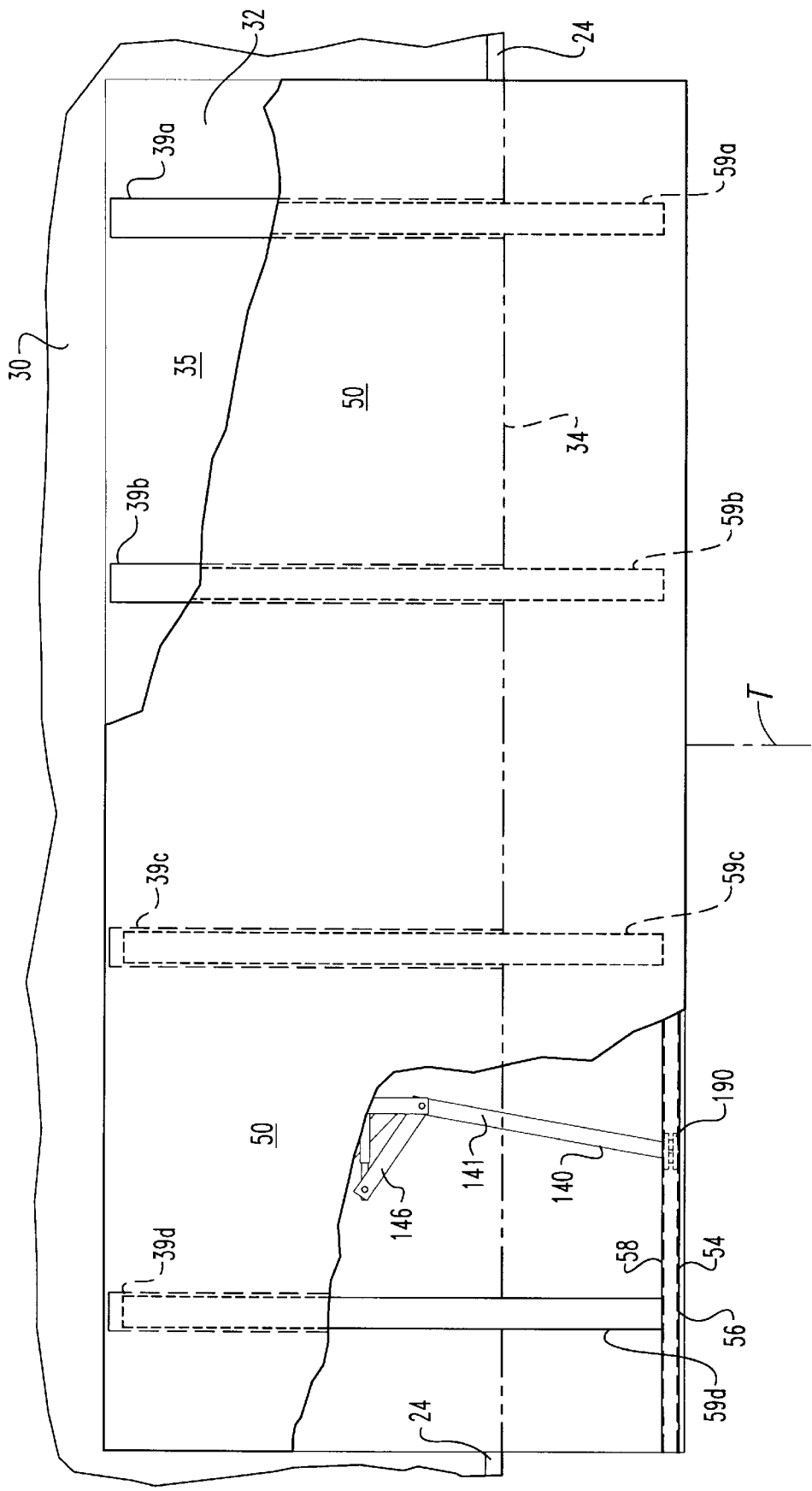
FIG. 7 is a cutaway top plan view of a slidable floor system for the preferred embodiment of FIG. 1.

FIGS. 4, 5, and 7 depict the relationship of floor 30 of fixed section 20 with floor 50 of expandable section 40. Notably floor 30 is underneath floor 50 and floor 50 is configured to slide along floor 30 when expandable section 40 is adjusted between expanded and unexpanded positions. Floor 50 is rigid and planar and generally moves along a horizontal plane. Also, floor 50 includes a guide slot 54 along the outer wall 46 of expandable section 40. Slot 54 is situated between outer side 56 and inner side 58. Generally, slot 54 is oriented along a horizontal axis perpendicular to the R1, R2, R3, and T axes. Each slide block 180, 190 engages slot 54 and is configured to slide therealong. The height of floor 50 relative to floor 30 and carriage 100 may be varied by adjusting the position of spindles 182, 192 in bearing portions 130b, 140b.

Having described the structure of carriage 100, the operation of carriage 100 and its application in vehicle 10 is next discussed. FIG. 3 shows carriage 100 in a retracted position corresponding to an unexpanded position of expandable section 40. FIG. 4 shows carriage 100 in an extended position corresponding the the expanded position of expandable section 40. FIG. 4 depicts arcuate paths P1 and P2 of arms 130, 140 when rotated about R1, R2, respectively. Also, the retracted position of arms 130, 140 are shown in FIG. 4 in phantom.

With carriage 100 starting in a retracted position, plunger 174 is at a minimal length being mostly nested within body 171 of hydraulic cylinder 170. To rotate arms 130, 140 and correspondingly move expandable section 40 relative to fixed section 20, pressurized hydraulic fluid is sent by controllable hydraulic pump 162 through conduit 164 to push a piston attached to plunger 174 inside body 171 (not shown). Plunger 174 is correspondingly pushed out of hydraulic cylinder 170 and pushed against arm 130 via mounting portion 176. Arm 130 correspondingly pivots in relation to hydraulic cylinder 170 and also swings outward away from vehicle 10 along path P1—rotating about axis R1.

As arm 130 rotates outward, oblique portion 136 correspondingly rotates to push rod 150. Rod 150 correspondingly pushes oblique portion 146 of arm 140 and causes arm 140 to rotate outward along with arm 130. In this manner, the pivotable linkage of rod 150 between arms 130 and 140 provides for the tandem rotation of arms 130, 140 upon rotation of either arm by an actuator such as hydraulic cylinder 170. The tandem rotation of arms 130, 140 correspondingly moves slide blocks 180, 190 along slot 54, and slide blocks 180, 190 push outward against outer side 56 to correspondingly move floor 50 laterally outward from fixed section 20. Floor 50 generally slides on floor 30 along a horizontal plane. Because floor 50 is coupled to expandable section 40, expandable section 40 moves outward with rotation of arms 130, 140. Extension of carriage 100 and the corresponding expanded position of expandable section 40 is illustrated in FIGS. 1, 4, and 5.

Retraction of carriage 100 is accomplished by configuring hydraulic pump 162 to send pressurized fluid through conduit 166 to correspondingly retract plunger 174 into body 171 of double acting hydraulic cylinder 170. Correspondingly, plunger 174 pulls against arm 130 which causes rotation of arm 130, and also arm 140 through the pivotal connection of rod 150 to oblique portions 136, 146.

During retraction, slide blocks 180, 190 slide in slot 54 in a direction opposite the direction traveled during extension. Correspondingly, during retraction, slide blocks 180, 190 pull against inner side 58 to pull floor 50 of expandable section 40 inward. Likewise expandable section 40, joined to floor 50, is correspondingly pulled inward toward vehicle 10. FIGS. 2 and 3 show carriage 100 in the retracted position.

Not only do arms 130 and 140 provide for controlled movement of expandable section 140, but also bear the load of expandable section 40 in the expanded position without the need for additional ground engaging supports. Generally, the load bearing arm structure of carriage 100 is lighter weight and takes up less space relative to conventional telescoping tube supports. In part, this efficiency is related to the cantilever configuration of arms 130 and 140. As shown for arm 130 in FIG. 5, arm 130 has a distance Y which corresponds to the hinge length of the pivoting anchor attachment of anchor portion 130a to bracket 110 along axis R1. Arm 130 also has a support length X generally perpendicular to axis R1 as shown in FIG. 5. In part, the load bearing capability of arm 130 is determined as a function of a support ratio=support length÷hinge length. For FIG. 5, the support ratio=X÷Y. It is preferred that the support ratio be in a range of about 1–3. It is more preferred that the support ratio be in a range of 2.4 to 2.8. It is most preferred that the support ratio be about 2.6.

In other embodiments, load bearing arms may be configured outside this range, and indeed may be configured so that anchor portions and bearing portions are not rigidly attached to one another, but instead articulate with respect to each other. In still other embodiments, support arms are configured as simple beams having ground engaging supports in the extended position. Although a two swing arm carriage 100 is preferred, fewer or more arms are also contemplated in alternative embodiments. Also, arms 130, 140 may be configured to engage a slot in outer wall 46 instead of floor 50. Alternatively, rollers or wheels may be used in place of slide blocks 180, 190.

Preferably, expandable section 40 is illustrated as a relatively rigid room with side walls 42, 44, outer wall 46, roof 48, and floor 50 all rigidly coupled together in relation to one another to form a telescoping section slidingly coupled to fixed section 20. This configuration of expandable section 40 permits continuous occupancy whether in the expanded or unexpanded position. In alternative embodiments, fewer or less walls may be used and the floor or roof may not be coupled to the walls. Instead, the floor, roof, and walls may be separately extendable or movable in relation to the rest of the expandable section. In addition, the walls, floor, or roof may be foldable or pivotable in relation to the rest of the expandable section in alternative embodiments. Also, expandable section 40 may be configured to emerge from the rear of a vehicle as well as from the side.

Figure 6:
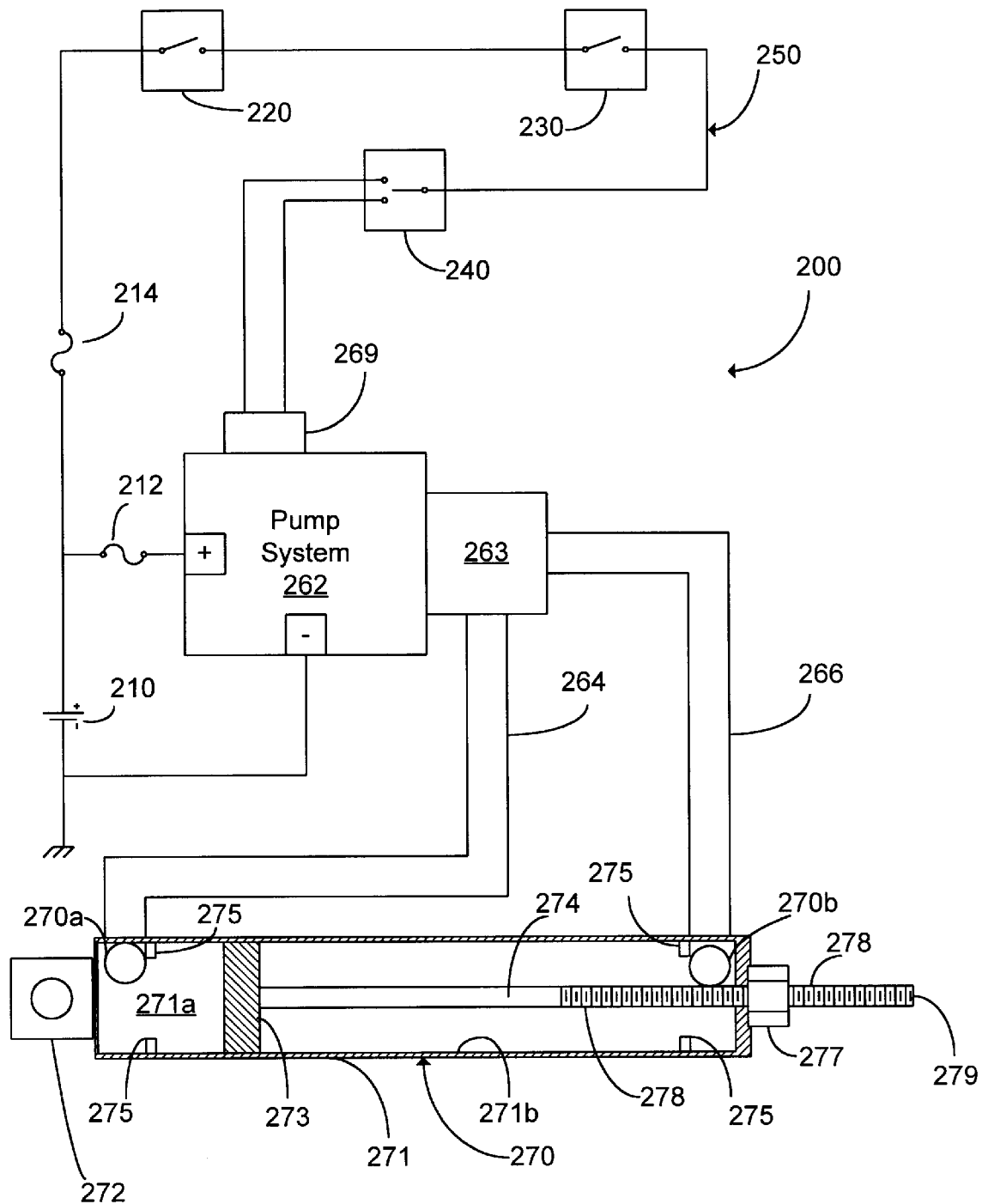
FIG. 6 is a partial diagrammatic depiction of an actuation system of one preferred embodiment of the present invention.

FIG. 6 illustrates an alternative actuation system 200 for use with carriage 100 of the present invention. Carriage control system 200 includes a controllable hydraulic pump system 262 including a controllable valve portion 263 and a control signal portion 269. Pump system 262 is selectively powered by vehicle electrical battery 210 by coupling to the depicted+/−terminals with a safety fuse 212 interposed on the positive voltage side. Battery 210 and pump system 262 are of a conventional design. Controllable valve portion 263 is coupled to hydraulic actuator 270 by conduits 264 and 266.

Control circuit 250 is coupled to the positive side of battery 210 via fuse 214. Control circuit 250 comprises a number of switches 220, 230, 240 coupled in series between fuse 214 and control signal portion 269. Control switch 240 is a multiposition, multipole switch for controlling activation of pump system 262 which correspondingly controls actuation of hydraulic actuator 270. Preferably, control switch 240 is of a spring-loaded rocker design which has two active positions and a "center off" position. In order for control switch 240 to send the appropriate control signals to pump system 262, switches 220 and 230 must be closed so that current can flow through circuit 250 to control switch 240.

Switches 220 and 230 are both safety switches to prevent inadvertent or unauthorized use of system 200. Key lock switch 220 is provided to prevent unauthorized actuation, and is preferably a single pole, single throw switch which requires a key to operate. Emergency brake switch 230 is coupled to an emergency brake (not shown) for vehicle 10 either mechanically or electrically and is preferably configured as a single pole, single throw switch which is only closed if the emergency brake is set. As a result both safety switches 220 and 230 must be electrically closed by using the appropriate key and setting the emergency brake, respectively, before pump system 262 may be activated.

In a schematic cross-sectional view, hydraulic actuator 270 has a body 271 defining chambers 271a and 271b separated by piston 273 which is connected to plunger 274. Body 271 has a mounting ear 272 and plunger 274 has threads 278 up to the mounting end 279 outside of body 271. Threads 278 on mounting end 279 may be engaged to couple plunger 274 to a carriage swing arm or other mechanism requiring actuation, using conventional methods. Nut 277 is also configured to engage threads 278 along the length of plunger 274. Body 271 defines openings 270a, 270b for corresponding connection to conduits 264, 266 from pump system 262. Hydraulic actuator 270 also includes stops 275 to limit travel of piston 273 so that outlets 270a, 270b are not blocked.

The function of actuation system 200 is next discussed. Safety key lock switch 220 and emergency brake switch 230 of control circuit 250 must be closed to activate actuation system 200. Once switches 220 and 230 are closed, control switch 240 is able to selectively actuate actuator 270 via pump system 262. In one position control switch 240 sends a signal to pump system 262 which causes system 262 to supply pressurized hydraulic fluid into chamber 271a through conduit 264 and outlet 270a. Piston 273 is correspondingly pushed away from outlet 270a and plunger 274 moves out of body 271. For this position, pump 262 is also configured to allow fluid present in chamber 271b to flow toward pump 262 through outlet 270b and conduit 266.

Control switch 240 also has a second position to reverse the direction of plunger 274 relative to the first position. The second position sends a signal to pump system 262 to cause pressurized hydraulic fluid to flow through conduit 266, outlet 270b, and into chamber 271b. The fluid in chamber 271b pushes against piston 273 to cause plunger 274 to retract into body 271.

For one preferred embodiment, the amount of retraction or extension of plunger 274 with respect to body 271 is controlled by the amount of time control switch 240 is engaged in either the first or second position and the stroke of plunger 274 within body 271. Stoppers 275 limit the stroke or travel length of plunger 274 to prevent blockage of outlets 270a, 270b. Control switch 240 is also configured with an off position which maintains the plunger 274 in a selected position. Preferably, pump system 262 is able to detect if a stroke limit has been reached and take appropriate action to prevent damage to system 200.

Besides stoppers 275, additional stroke length adjustment is provided by nut 277 when threaded on plunger 274. Nut 277 may be selectively positioned along plunger 274 by turning nut 277 about the longitudinal axis of plunger 274. Adjustment of nut 277 therealong provides further limiting of the degree of retraction of plunger 274 into body 271. Using a hydraulic actuator 270 configured in this manner as a substitute for hydraulic cylinder 170 in carriage 100, the nut 177 may be utilized to fine tune for tolerances of the carriage structure. As a result, stresses which are caused by "overretraction" of a plunger can be avoided. Avoidance of such stresses on carriage members further enhances the ability to avoid binding.

In an alternative embodiment, an electromechanical actuator is envisioned instead of a linear hydraulic actuator like 270. In another alternative embodiment two single acting hydraulic cylinders are used in place of a double acting hydraulic actuator. In this configuration, each single acting cylinder operates in a direction reverse to the other. In a variation of this configuration, each cylinder is coupled to a different load bearing arm in a swing arm configuration similar to carriage 100. In still another embodiment, an operator powered system is envisioned using a foot pump or hand crank.

Pump system 262 may additionally be used to actuate other hydraulic systems for the vehicle. Also, instead of control circuit 250, system 200 may be modified to interface with a microprocessor based system in a conventional manner.

Figure 8:
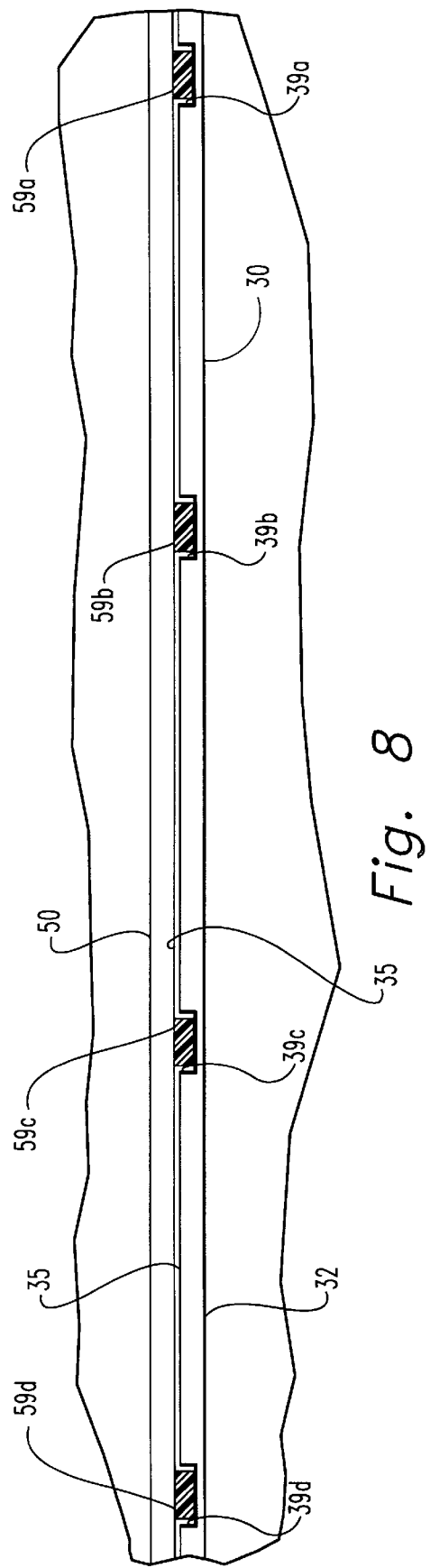
FIG. 8 is a partial side sectional view of the floor system shown in FIG. 7.

Referring to FIGS. 5, 7, and 8, another aspect of the present invention is shown. Floor 50 of expandable section 40 includes guide rails 59a–59d which are generally parallel to the direction of travel of expanded section 40 along axis T. These rails are preferably made from a self-lubricating polymeric resin. In one preferred embodiment, the rail material includes nylon.

Each guide rail slides in a corresponding guide slot 39a–39d. Slots 39a–39d are defined by a support surface 35 of a raised floor portion 32 of floor 30. An outer edge 34 of raised floor portion 32 is shown in phantom in FIG. 7. Edge 34 is generally flush with external wall 24. Each guide slot 39a–39d also is generally parallel with axis T. In alternative embodiments, at least a portion of each guide rail 39a–39d may include a self-lubricating polymeric resin—such as nylon—either as an alternative to the composition of rails 59a–59d from a self-lubricating polymeric resin or in addition to rails 59a–59d being made from a self-lubricating polymeric resin.

Rails 59a–59d slide along guide slots 39a–39d as expandable section 40 is moved relative to fixed section 20. The rails 59a–59d provide a simple alternative to rollers or wheels common to existing systems, but at the same time, the self-lubricating properties of the rail/slot configuration sacrifices little in terms of performance. Generally, this rail/slot arrangement enhances nonbinding travel of expandable section 40.

In other embodiments, more or less rails in corresponding slots are envisioned. Also, the fixed portion may have one or more rails in corresponding slots defined by the movable floor. The rail/slot arrangement of the present invention may also be used independent of the type of expansion system or expandable portion configuration. Furthermore, other embodiments of the present invention may not employ the guide rail/slot configuration feature.

Next referring to FIGS. 9–12, a coupling latch 300 of the present invention is shown. The coupling latch 300 has a member 310 with opposite sides 312, 314 and opposite ends 316, 318. Member 310 has a top surface 326 opposite a bottom surface 328. Side 314 defines a notch 330 with interface 332. Member 310 also has guide shoulders 321, 322, 323, and 324.

Member 350 includes guide rails 352, 354 opposing each other. Guide rails 352, 354 define a channel 356 therebetween. Channel 356 has an entry end 357 and terminal end 359. Terminal end 359 is bounded by header 360 configured with shoulder sides 361, 362. Member 350 has a top surface 366 opposite a bottom surface 368. Rail 354 defines a notch 370 intersecting channel 356. Notch 370 has a floor 372.

Figure 9:
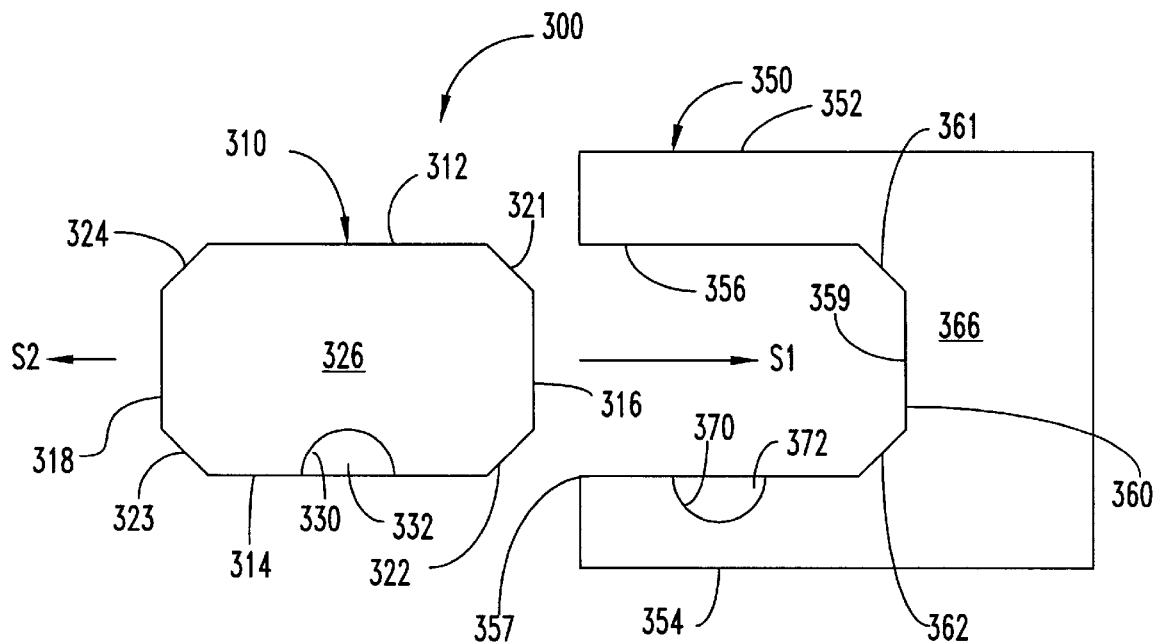
FIG. 9 is a top view of a coupling latch of another preferred embodiment of the present invention.
Figure 10:
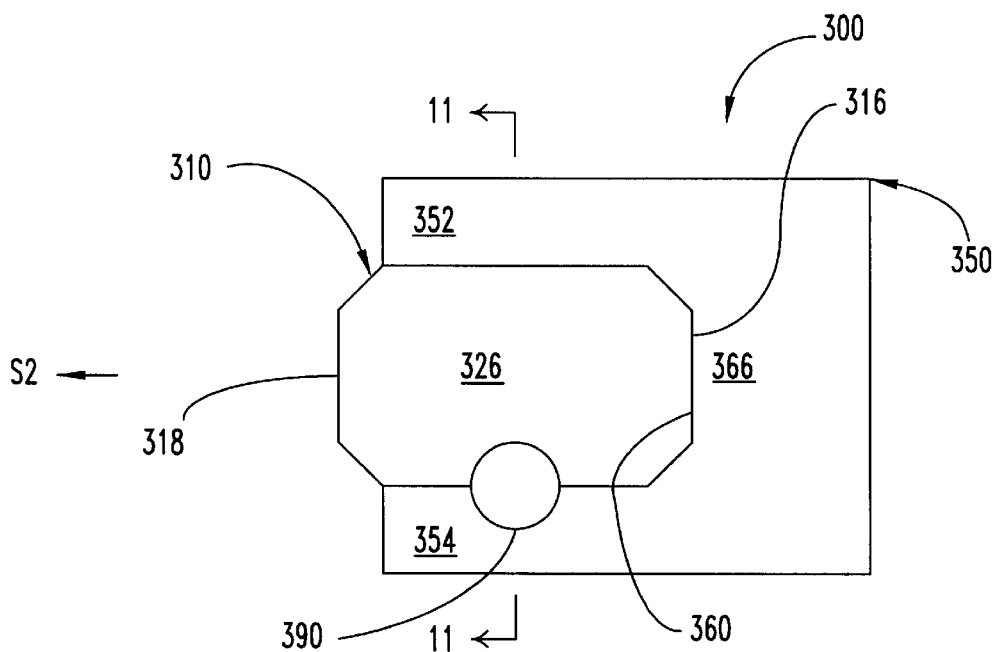
FIG. 10 is a top view of the embodiment shown in FIG. 9.

Referring to FIG. 9, operation of coupling latch 300 is next discussed. Member 310 moves relative to member 350. Member 310 is configured to slide between guide rails 352, 354 and into channel 356 along arrow S1. Preferably, member 310 is configured to fit snugly between rails 352, 354. Movement along arrow S1 is stopped by header 360 when end 316 reaches terminal end 359 as shown in FIG. 10. Notably, shoulders 321, 322 help to guide end 316 of member 310 into entry end 357 of channel 356.

Figure 11:
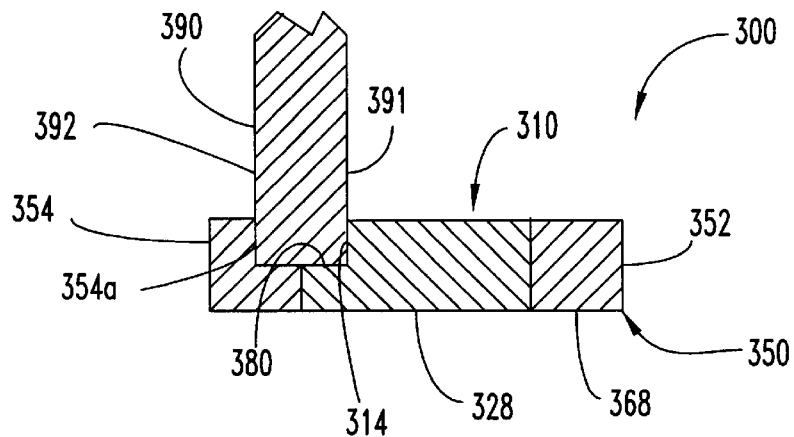
FIG. 11 is a cross-sectional view taken along line 11—11 of FIG. 10.
Figure 12:
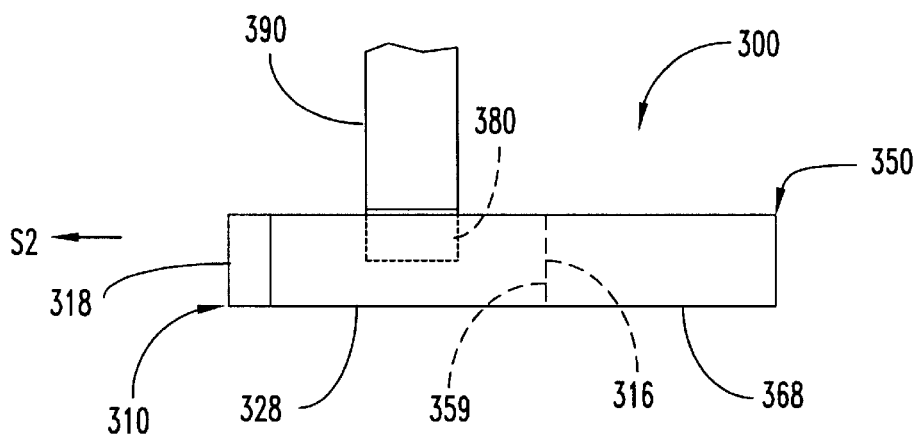
FIG. 12 is an elevational side view of the embodiment shown in FIG. 9.

When end 316 meets header 360, notch 330 aligns with notch 370 to form cavity 380 as shown in FIGS. 10 and 12. FIGS. 10–12 also show a coupling pin 390 inserted into cavity 380. Pin 390 snugly fits into cavity 380 to prevent substantial movement of member 310 relative to member 350 along any plane parallel to the view plane of FIG. 10. Member 310 cannot be moved along directional arrow S2 without breaking or deforming at least one of members 310, 350, and pin 390. Referring to FIG. 11, coupling pin 390 is shown with opposing sides 391, 392. Notably, when engaged in cavity 380, side 392 contacts side 354a of guide rail 354 and side 391 contacts side 314 of member 310.

As illustrated, members 310, 350 are configured as substantially planar plates; however, in other embodiments, one or more of members 310, 350, and pin 390 may be shaped differently as would occur to one skilled in the art. For example, member 350 need not have a header 360 to facilitate alignment of notches 330 and 370. Also, some embodiments do not have shoulders 321, 322, 323, and 324, or these shoulders are shaped differently. In addition, interface 332, floor 372,. or both may be absent. In an embodiment having neither interface 332 nor floor 372, chamber 370 becomes a bore so that coupling pin 390 may completely pass through members 310 and 350 during latching. However, even without interface 332, and floor 372, pin 390 need not pass completely through either member 310 or member 350 to substantially prevent movement of member 310 relative to member 350. As a result, coupling latch 300 provides a way to interlock two bodies together that are movable in relation to each other without needing to align holes for the passage of a coupling pin therethrough.

Members 310, 350 can each be mounted on walls or other surfaces movable in relation to each other to provide for selective coupling with pin 390. Similarly, either member may be defined or formed from a continuous surface.

FIGS. 13–16 illustrate a coupling system for an enclosure using a coupling latch of the present invention. Housing system 400 includes walls 401 and 402 movable relative to each other along axis M. Generally walls 401 and 402 are parallel to each other, and move along a plane parallel to axis M. In one embodiment, walls 401 and 402 are part of a vehicular enclosure having an expandable portion and a fixed portion.

Figure 13:
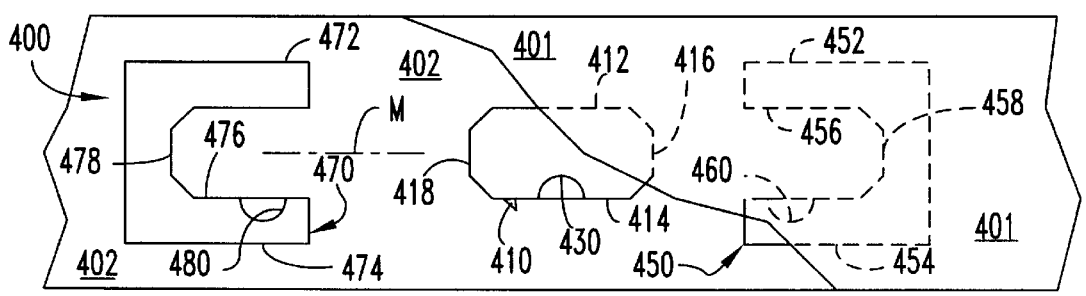
FIG. 13 is a cutaway side view of a coupling system of yet another preferred embodiment of the present invention.

FIG. 13 shows a cutaway side view of coupling members 450 and 470 extending from wall 402. Coupling finger 410 projects from wall 401 and is selectively movable between coupling members 450, 470 along axis M as wall 401 moves relative wall 402. Coupling finger 410 has opposite ends 416, 418 and opposite sides 412, 414. Side 414 defines a notch 430. Coupling member 450 has opposing guide rails 452, 454 defining channel 456 therebetween. Channel 456 terminates at header 458. Guide rail 454 defines notch 460 intersecting channel 456. Coupling member 470 has opposing guide rails 472, 474 defining channel 476 therebetween. Channel 476 terminates at header 478. Guide rail 474 defines notch 480 intersecting channel 476. The illustration of FIG. 13 contemplates finger 410 and members 450, 470 as separate bodies that are attached to walls 401,402 using conventional methods; as integral unitary portions or formations of walls 401, 402 defined by the respective wall surfaces; or a combination of these depictions.

Figure 14:
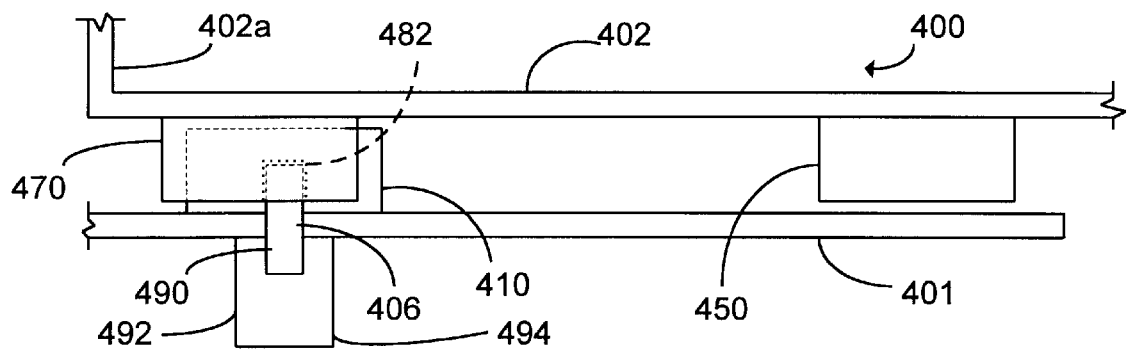
FIG. 14 is a diagrammatic top view of one state of operation of the embodiment shown in FIG. 13.
Figure 15:
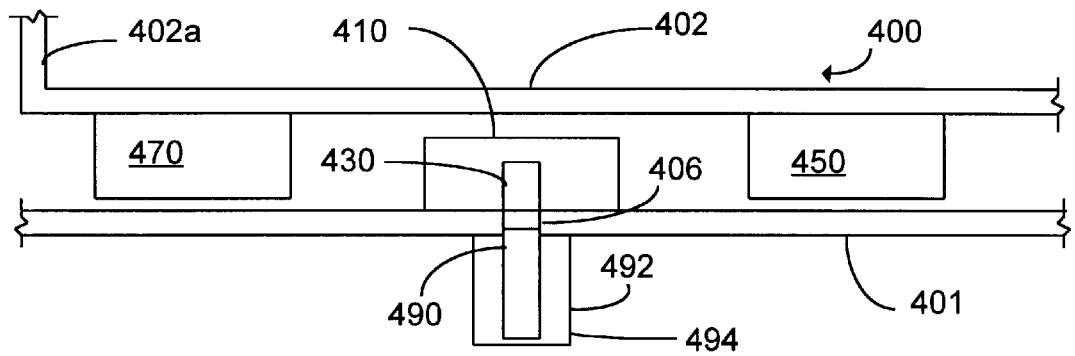
FIG. 15 is a diagrammatic top view of the embodiment of FIG. 13 in a different state of operation.
Figure 16:
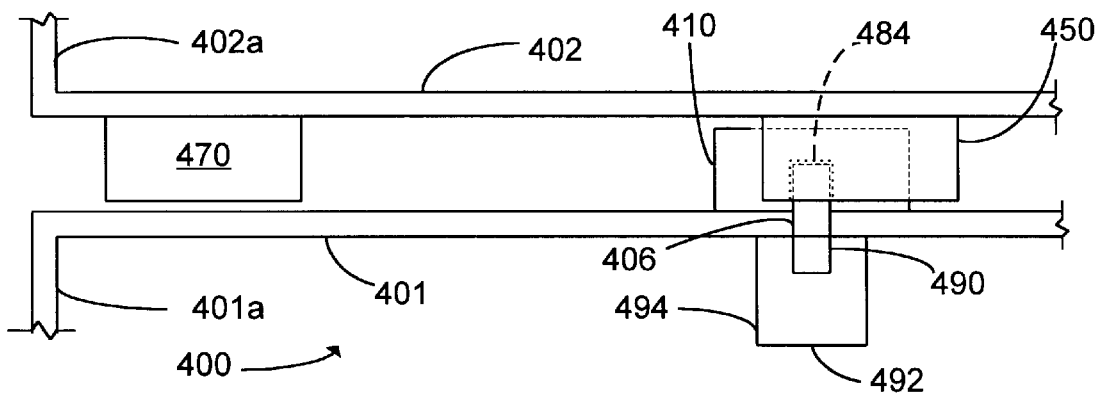
FIG. 16 is a diagrammatic top view of the embodiment of FIG. 13 in yet another state of operation.

FIGS. 14–16 are partial top sectional views of the embodiment shown in FIG. 13 with walls 401 and 402 in different relative positions. In FIG. 14, coupling finger 410 is illustrated as a projection from wall 401 and is shown engaged in channel 476 so that notches 430 and 480 align to form chamber 482. Chamber 482 aligns with aperture 406 defined by wall 401. In addition, coupling pin 490 is shown coupled to controllable actuator 492. Actuator 492 is attached to wall 401 opposite finger 410 so that coupling pin 490 may pass through aperture 406. Activation of actuator 492 causes coupling pin 490 to pass through aperture 406 and engage chamber 482. When engaged in chamber 482, pin 490 prevents separation of finger 410 from coupling member 470 in a manner described for coupling latch 300. Wall 401 extends past corner wall 402a which may correspond to the extended position of expandable section 40 such as shown in FIG. 1.

FIG. 15 shows an intermediate position of finger 410 between coupling members 450 and 470. This position of finger 410 corresponds to movement of walls 401 and 402 relative to one another between coupling positions. Coupling pin 490 is disengaged from coupling member 470 and is retracted into housing 494 of actuator 492.

FIG. 16 shows another coupling position of walls 401 and 402 corresponding to engagement of finger 410 in channel 456 of coupling member 450. When finger end 416 meets header 458, notch 430 is aligned with notch 460 to form chamber 484. Coupling pin 490 is engaged in chamber 484 to interlock coupling member 450 and finger 410 together, preventing substantial movement of walls 401, 402 relative to each other. Corner walls 402a, 401a are generally aligned which may correspond to the unextended position of expandable section 40 shown in FIG. 2.

In another embodiment, wall 402 is configured to define a channel with appropriately spaced intersecting side notches as a substitute for members 450, 470. For a substantially planar wall as shown in FIGS. 13–16, the notched channel of this configuration would generally lie below the plane of the wall surface.

Actuator 492 may be a solenoid or hydraulically controlled device of a conventional type. Preferably, actuator 492 holds pin 490 in engagement with chamber 482 even when the power source for the actuator fails. In other embodiments, actuator 492 is a spring-loaded faster operated manually or another type of actuator conventionally used to direct linear motion of a body. It is also preferred that actuator 492 be coupled to a control system which prevents inadvertent release of coupling pin 490 from chamber 482 when such release can adversely impact safety. One example is the application of the system shown in FIGS. 13–16 to provide for selective coupling of an expandable portion of a vehicle in expanded and unexpanded states.

Figure 17:
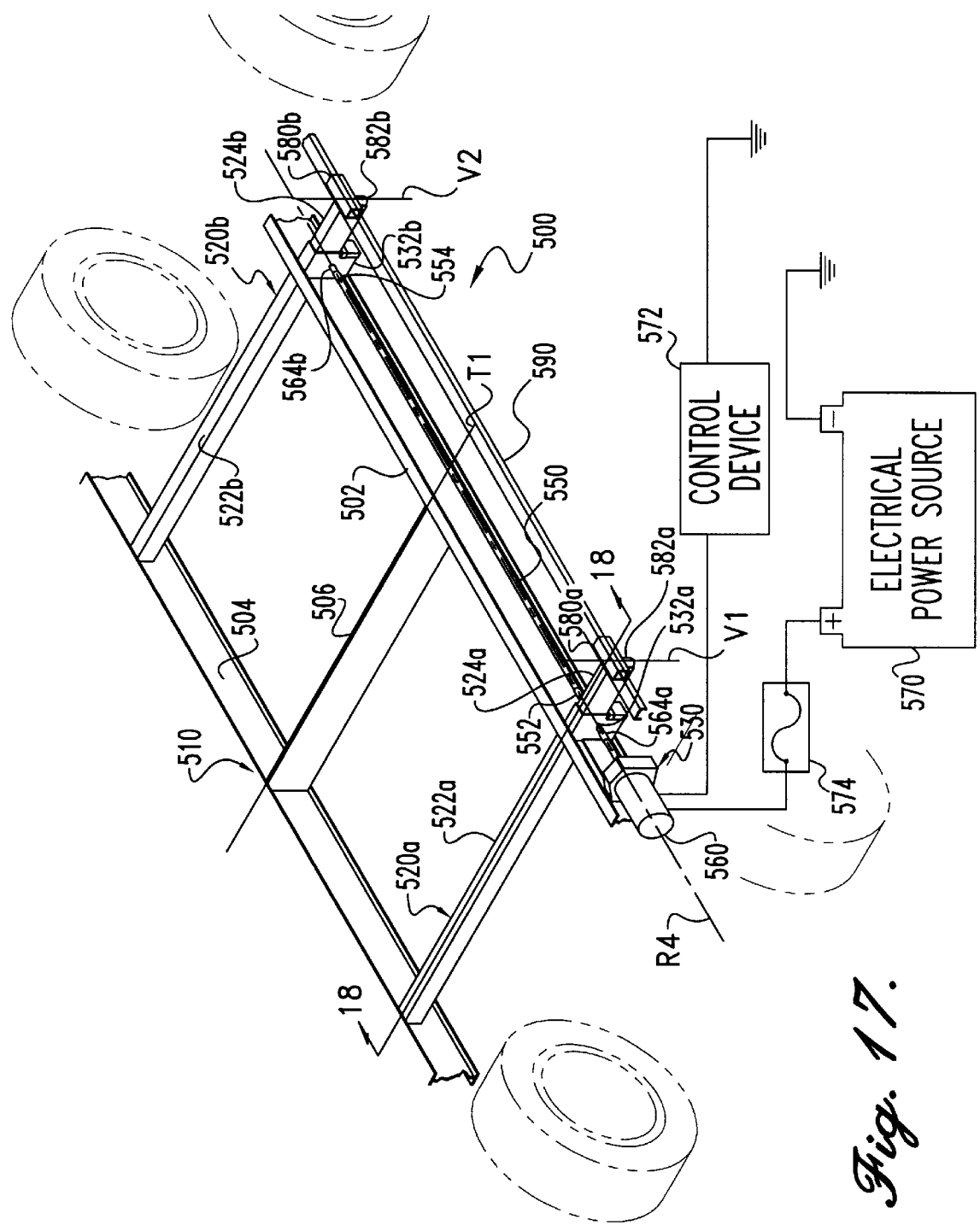
FIG. 17 is a partial perspective view of an expandable room system for another preferred embodiment of the present invention.

FIG. 17 illustrates expandable room system 500 of another embodiment of the present invention. System 500 includes vehicle chassis 510 (partially shown) with support beams 502 and 504 joined by cross beam 506. Chassis 510 is preferably configured as part of a recreational vehicle with beams 502, 504 being oriented along the length of the vehicle. This vehicle may be similar to that shown in FIGS. 1 and 2. System 500 further includes two telescopic arms 520a and 520b to position and support an expandable room portion along axis T1. This expandable room portion may be similar to expandable section 40 depicted in FIGS. 1–2; however, a room or section is not depicted in FIG. 17 in order to enhance clarity of certain features of the present invention.

Arm 520a includes tube 522a and arm 520b includes tube 522b. Tubes 522a, 522b are generally stationary relative to chassis 510. In fact, it is preferred that tubes 522a, 522b be joined to beams 502, 504 in a transverse relationship to enhance structural integrity of chassis 510. At least partially nested within each tube 522a, 522b is a corresponding moveable section or segment 524a, 524b. Movable sections 524a, 524b are each configured to slidingly engage the corresponding tube 522a, 522b, and to extend and retract in a telescopic manner along axis T1 relative thereto. Preferably, tubes 522a, 522b and sections 524a, 524b are formed from tubular steel of an appropriate thickness having a generally rectangular cross section; however, other materials and geometries are contemplated as would occur to one skilled in the art. Operator controlled mechanism 530 is coupled to arms 520a, 520b, to selectively position moveable sections 524a, 524b relative to tubes 522a, 522b, respectively.

Figure 18:
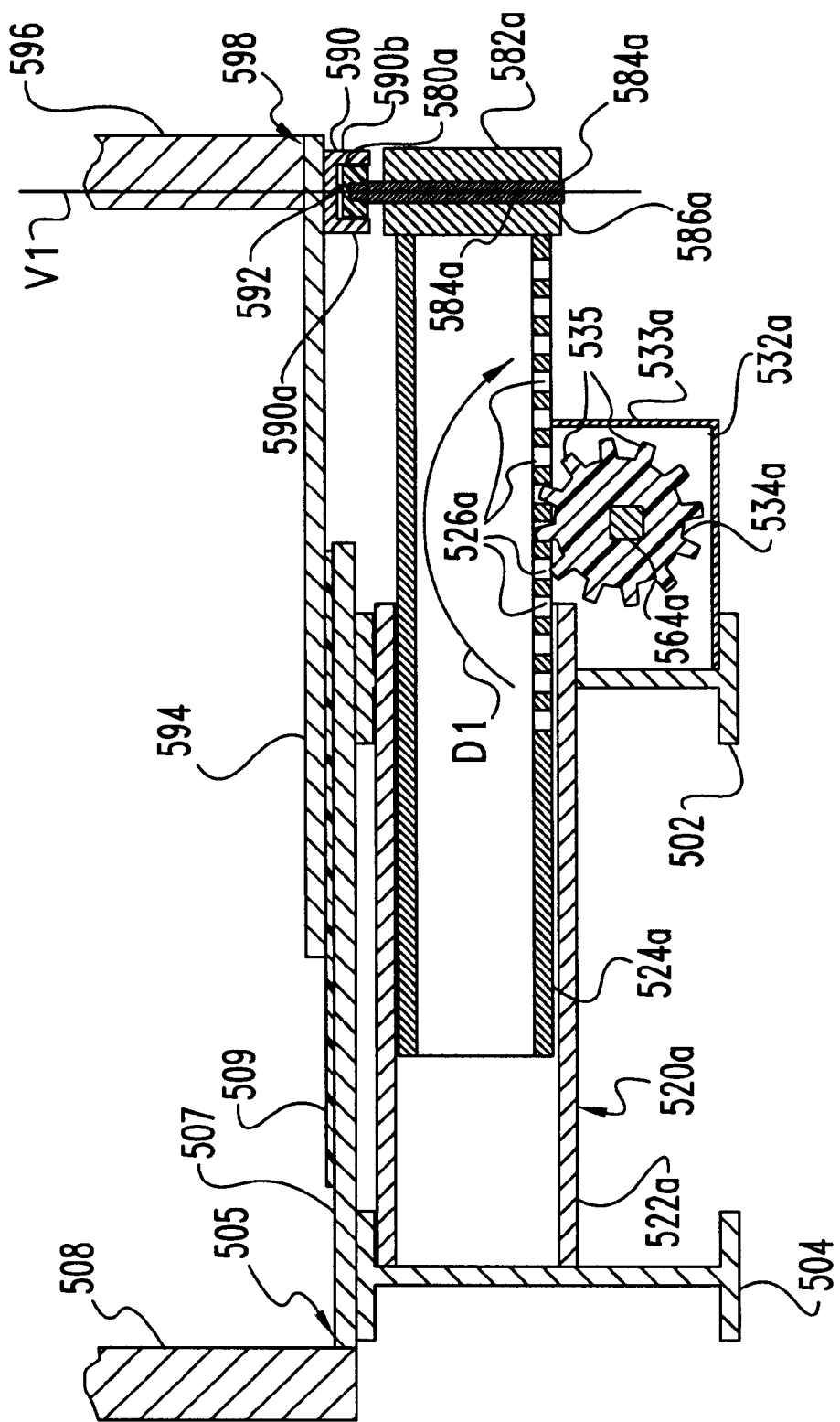
FIG. 18 is a cross-sectional elevational view taken along line 18—18 of FIG. 17.
Figure 19:
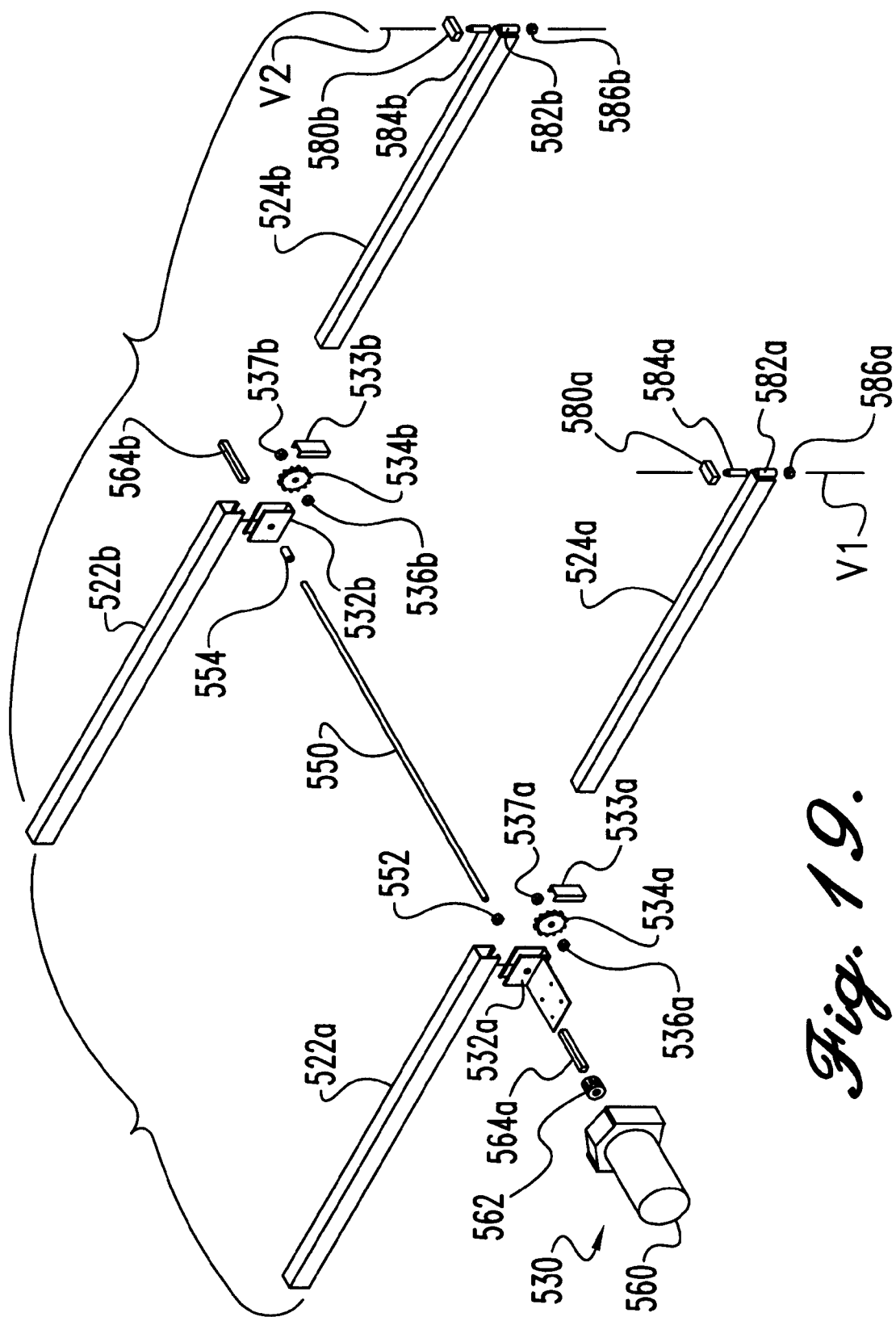
FIG. 19 is an exploded partial view of the embodiment shown in FIG. 17.

Referring additionally to FIGS. 18 and 19, arms 520a, 520b further include bearing members 580a, 580b each pivotally mounted at a corresponding end portion of moveable sections 524a, 524b. Bearing sleeves 582a, 582b are each configured to receive an approximately vertical mounting pin 584a, 584b, respectively. Hex plugs 586a, 586b retain pins 584a, 584b within sleeves 582a, 582b. Each bearing member 580a, 580b defines a recess for engagement by the respective pin 584a, 584b. Bearing members 580a, 580b are each configured to rotate about generally vertical axes V1, V2, respectively.

Expandable portion 598 and fixed portion 505 of system 500 are partially illustrated in FIG. 18. Fixed portion 505 has upright wall 508 connected to stationary floor 507. Expandable portion 598 has upright wall 596 and floor 594 fixed to one another. Similar to previously discussed embodiments, the relative position of expandable portion 598 to fixed portion 505 defines the total occupiable living space of the vehicle. Floor 594 is of a rigid construction that moves along a generally horizontal plane and slidingly engages floor 507 of portion 505 in a bearing relationship. Bearing strip 509 is shown between floors 507 and 594. Preferably, bearing strip 509 is made from a self-lubricating polymeric material such as nylon (polyamide compound) or an ultra-high-molecular-weight polyethylene compound. Preferably, a number of bearing strips 509 are attached to floor 594 or floor 507, to provide the primary bearing contact therebetween. This self-lubricating bearing arrangement ordinarily avoids the need to apply grease or oil lubricants. Also, floors 507, 594 may be constructed with the slot and rail construction described by FIGS. 7–8 and accompanying text.

Portion 598 further includes a guide 590 illustrated in phantom in FIG. 17 and in cross section in FIG. 18. Guide 590 includes generally parallel rails 590a, 590b oriented along an axis generally perpendicular to the axis of travel T1. Rails 590a, 590b define a continuous channel 592 configured for engagement by bearing members 580a, 580b. Guide 590 is structurally similar to guide slot 54 illustrated and described in connection with FIGS. 4, 5, and 7. Guide 590 is configured for engagement by bearing members 580a, 580b in a load bearing relationship to selectively push (expand) or pull (retract) portion 598 relative to portion 505 along axis T1 in response to movement of moveable sections 524a, 524b of arms 520a, 520b. Furthermore, guide 590 permits movement of bearing members 580a, 580b relative to axis R4 along channel 592 which is generally perpendicular to axis T1.

Positioning of portion 598 is provided by mechanism 530. Mechanism 530 includes two housings 532a, 532b associated with corresponding arms 520a, 520b. Each housing has cover plate 533a, 533b, respectively. Furthermore, each housing includes rotatable bearing member 534a, 534b configured as a sprocket wheel with a number of radially extending teeth 535. Teeth 535 are particularly illustrated in the partial cross-sectional view of FIG. 18.

Each rotatable member 534a, 534b has a generally square-shaped aperture engaged by a corresponding bearing shaft 564a, 564b. Bearing shaft 564a is journaled to housing 532a with opposing bearings 536a, 537a, and bearing shaft 564b is journaled to housing 532b by opposing bearings 536b, 537b. Bearing shafts 564a, 564b are coupled between housings 532a and 532b by joining shaft 550. Joining shaft 550 is coupled to bearing shaft 564a by an adjustable coupler 552 which may be adjusted periodically to assure proper orientation of member 534a relative to member 534b. Preferably, adjustable coupler 552 is also configured to permit adjustment of the distance separating shaft 564a from 564b. Bearing shaft 564b is coupled to shaft 550 by a rigid coupler 554. Shafts 564a, 564b, 550 and associated couplings 552, 554 are all connected to electric motor 560 via spider coupling 562. Motor 560 is configured to rotate members 534a, 534b about axis R4. In an alternative embodiment, a single shaft is used to couple rotatable members 534a, 534b. In still other embodiments, different drive mechanisms are utilized in system 500.

An operator control device 572 is shown in FIG. 17 schematically coupled to motor 560. Device 572 is used to control activation of motor 560 and its rotational direction. Preferably, control device 572 is a three position switch configured to selectively activate motor 560 which correspondingly turn members 534a, 534b about axis R4. Also shown is electric power source 570 coupled to motor 560 via safety fuse 574. Preferably, electric power source 570 is a multipurpose automobile battery provided as part of a vehicle utilizing system 500.

Referring particularly to FIG. 18, when rotatable member 534a is rotated about shaft 564a, each tooth of teeth 535 is configured to engage an aperture 526a defined by a bottom surface of movable segment 524a. Engagement of movable segment 524b by rotatable member 534b is similarly configured although not shown. Thus, as rotatable member 534a is rotated in the direction indicated by arrow D1 (clockwise), section 524a moves outward from within tube 522a to correspondingly extend portion 598 relative to portion 505. Likewise, if rotatable member 534a is turned opposite arrow D1 (counterclockwise), teeth 535 consecutively engage corresponding apertures 526a of section 524a to retract section 524a relative to tube 522a, and correspondingly retract portion 598 relative to portion 505.

In operation, it is preferred that expandable portion 598 be selectively positioned over a continuous range relative to fixed portion 505 with mechanism 530. This range varies from a minimum to a maximum living space arrangement. A selected arrangement is provided by moving expandable portion 598 with arms 520a, 520b via corresponding bearing members 580a, 580b. Generally, the amount of living space is increased up to the maximum limit by extending moveable sections 524a, 524b from corresponding tubes 522a, 522b through operator input with control device 572. Extension is accomplished by energizing motor 560 with device 572 to turn shafts 564a, 564b, and rotatable members 534a, 534b, in a clockwise direction about axis R4 as indicated by arrow D1. To decrease the amount of living spacedown to the minimum limit, an operator uses control device 572 to cause motor 560 to rotate members 534a, 534b in a counterclockwise direction about axis R4 (opposite arrow D1), and correspondingly retract moveable sections 524a, 524b into tubes 522a, 522b, respectively. For an embodiment where device 572 includes a three position switch, a first position corresponds to extension, a second position corresponds to retraction, and a third position corresponds to no movement, or an "off" position. Preferably, motor 560 is of a low speed/high torque variety, providing about 6 RPM, and mechanism 530 is configured with a governor to automatically stop motor 560 when a minimum or maximum limit has been reached.

Like bearing strip 509, it is preferred that bearing members 580a, 580b and rotatable members 534a, 534b be formed from a self-lubricating polymeric material such as nylon or an ultra-high-molecular-weight polyethylene compound. In conjunction with one or more bearing strips 509, the provision of self-lubricating bearing surfaces between the fixed portion and movable portion of system 500 reduce or even may eliminate the need for other lubricants such as grease or oil. Commonly, grease and oil lubricants add to the maintenance costs of extension mechanisms and often collect dirt and grit which may damage the mechanism.

Another advantage of system 500 is that bearing engagement between arms 520a, 520b and portion 598 is provided by a floating contact between bearing members 580a, 580b and guide 590. Specifically, bearing members 580a, 580b not only transmit forces necessary to move and support expandable portion 598 along axis T1, but also relieve stresses that might otherwise accumulate in system 500 by moving along guide 590 in response to significant force components directed parallel to axis R4. Such forces may result when arm 520a has become slightly nonparallel with arm 520b. Similarly, a substantial force component perpendicular to axis T1 might result if portion 598 becomes misaligned relative to axis T1 or if rotatable members 534a, 534b become unsynchronized. Indeed, guide 590 permits bearing members 580a, 580b to travel in a direction along axis R4 such that a parallel relationship between 520a and 520b need not be maintained. It has been found that facilitating lateral movement of the bearing contact regions for an extension system in response to substantial forces along a direction not parallel to the axis of travel generally decreases binding. Furthermore, this floating contact feature promotes self-alignment of expandable room structures and often improves overall maintainability and cost-effectiveness.

Figure 20:
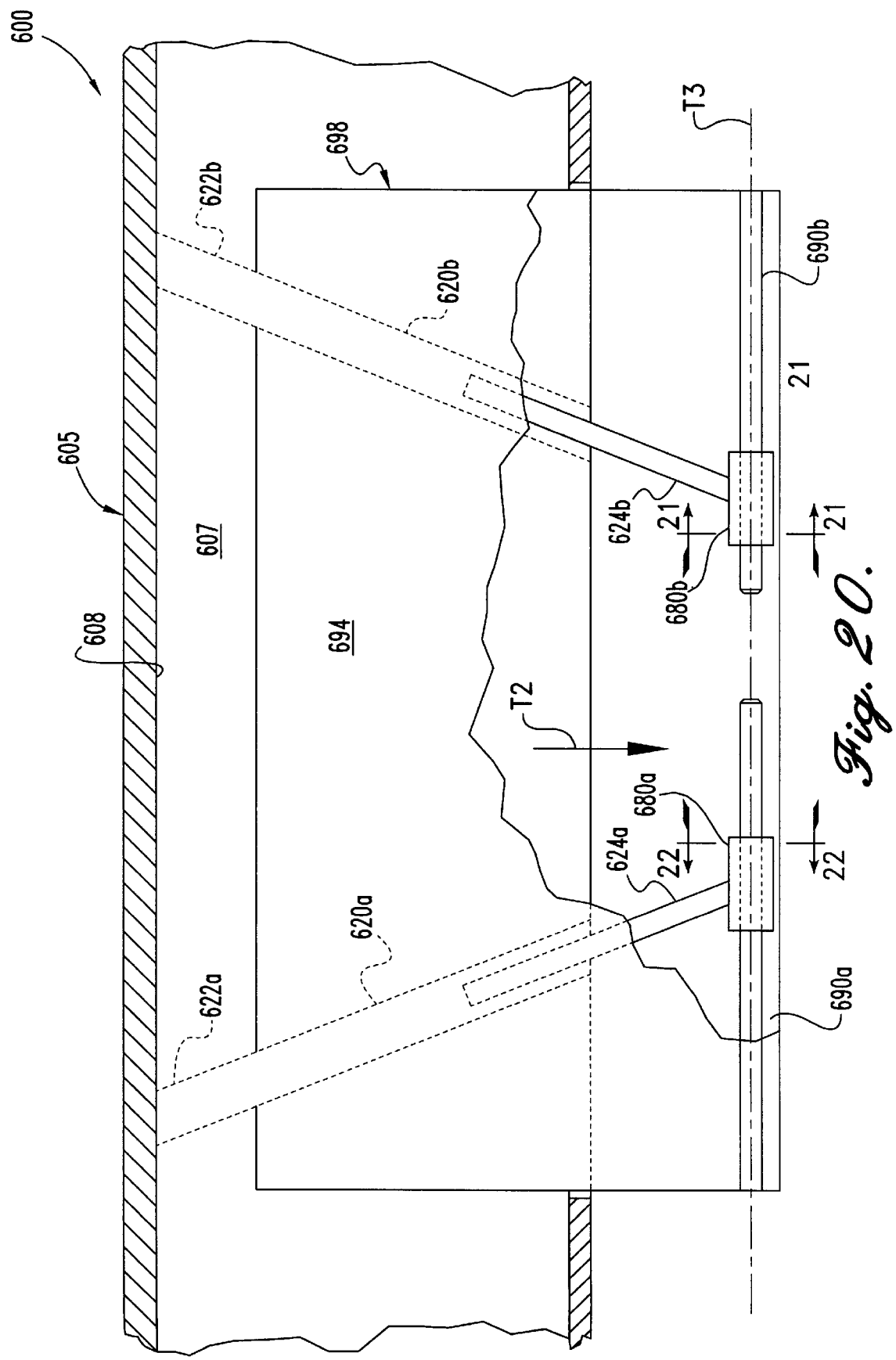
FIG. 20A is a partial top view of an expandable room system of yet another embodiment of the present invention.

In one embodiment, it is preferred that bearing members 580a, 580b, be formed from a self-lubricating polymeric material in a block configuration to slidingly engage guide 590. This block structure should be dimensioned and shaped so that bearing members 580a, 580b readily slide along channel 592 in response to forces having a component parallel to axis R4 of substantial magnitude. In other embodiments, bearing members 580*a*, 580*b* and guide 590 may be variously shaped and constructed as would occur to one skilled in the art. One alternative embodiment of bearing member and guide structures is provided by expandable room system 600 illustrated in FIGS. 20 and 21. System 600 includes a first occupiable portion 605 with wall 608 fixed to floor 607 and a second occupiable portion 698 movable relative to portion 605 to adjust volume of an occupiable living space defined by portions 605 and 698. Portion 698 includes floor 694 shown in a partial cutaway view. Portion 698 may also includes walls and a roof (not shown). System 600 includes nonparallel telescoping arms 620*a*, 620*b* mounted integrally in a vehicle chassis. Each arm 620*a*, 620*b* includes a stationary tube 622*a*, 622*b* configured to house a telescoping segment 624*a*, 624*b*. Telescoping segments 624*a*, 624*b* each include a pivotally mounted bearing member 680*a*, 680*b* configured similar to bearing members 580*a*, 580*b* in relation to movable sections 524*a*, 524*b* depicted in FIGS. 17–19. However, it should be noted that in system 600, the guide is provided by unconnected guide rails 690*a*, 690*b*. The nonparallel relationship between arms 620*a*, 620*b* is exaggerated for clarity.

Figure 21:
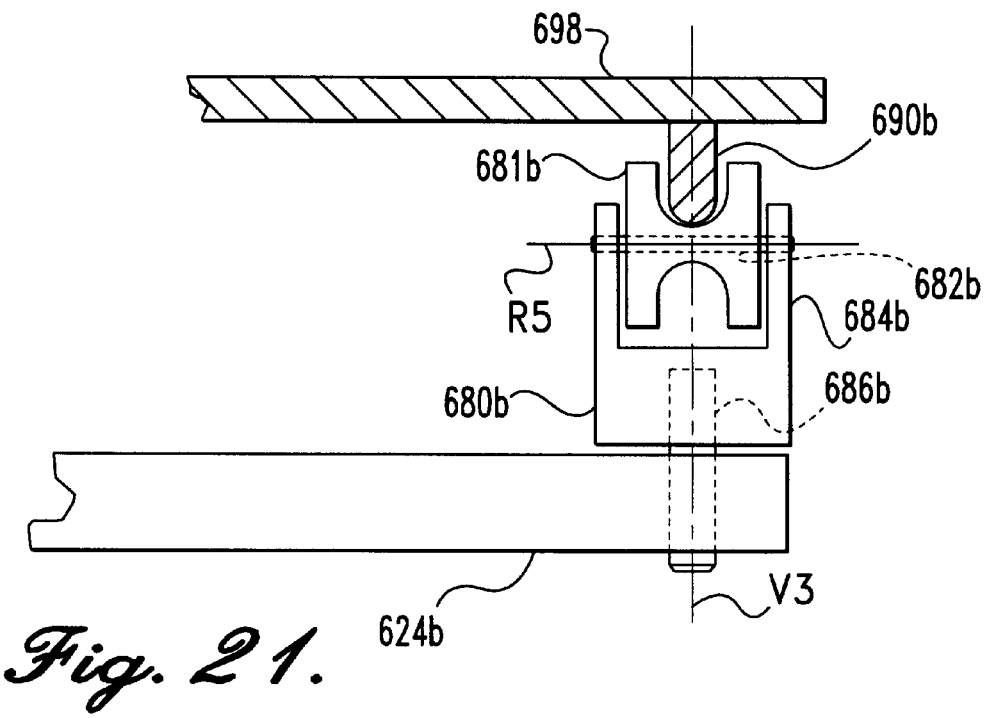
FIG. 21 is a partial cross-sectional elevational view taken along line 21—21 of FIG. 20.
Figure 22:
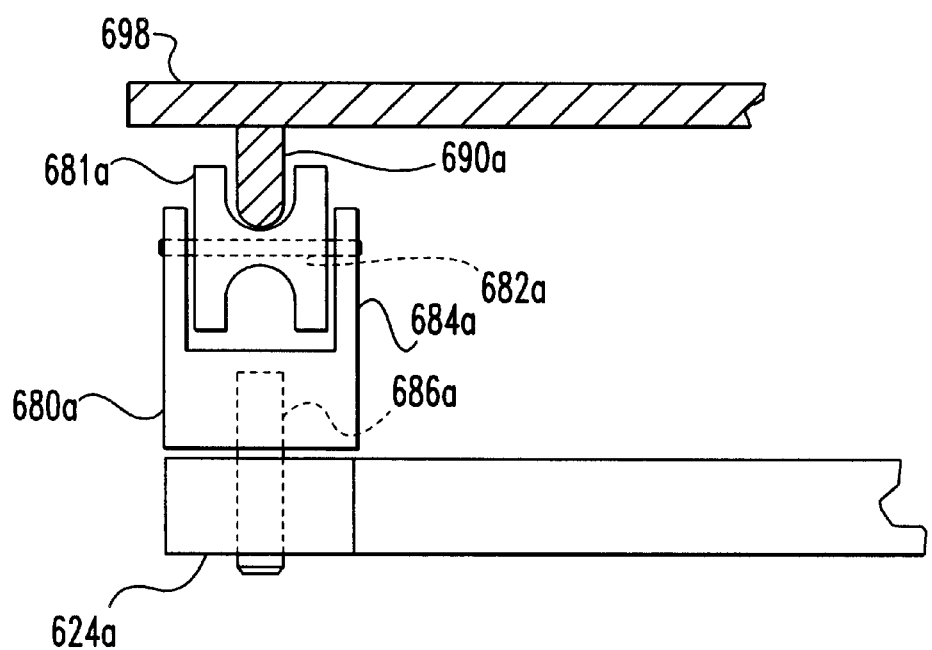
FIG. 22 is a partial cross-sectional elevational view taken along line 22—22 of FIG. 20.

Referring specifically to FIG. 21, guide rail 690*b* and bearing member 680*b* of segment 624*b* are further illustrated. Guide rail 690*b* is engaged by grooved wheel 681*b* of bearing member 680*b*. Wheel 681*b* is journaled to yoke 684*b* by shaft 682*b* oriented along axis R5. Wheel 681*b* is configured to rotate about shaft 682*b* and axis R5. Yoke 684*b* is configured to rotate about a generally vertical axis V3 via shaft 686*b*. Shaft 686*b* pivotally couples bearing member 680*b* to arm segment 624*b*. Arm segment 624*a*, bearing member 680*a* and guide rail 690*a* may be similarly configured, as illustrated in FIG. 22, wherein like components have been given like reference numbers. More specifically, guide rail 690*a* is engaged by grooved wheel 681*a* of bearing member 680*a*. Wheel 681*a* is journaled to yoke 684*a* by shaft 682*a* oriented along a generally horizontal axis. Wheel 681*a* is configured to rotate about shaft 682*a* and the generally horizontal axis. Yoke 684*a* is configured to rotate about a generally vertical via shaft 686*a*. Shaft 686*a* pivotally couples bearing member 680*a* to arm segment 624*a*. An operator controlled mechanism similar to that illustrated as mechanism 530 in FIGS. 17–19 may be adapted for use with the invention of FIGS. 20 and 21 to provide selective positioning of portion 698 relative to portion 605.

In operation, system 600 extends and retracts portion 698 relative to portion 605 to adjust occupiable living space. Bearing members 680*a*, 680*b*, engage guides 690*a*, 690*b*, respectively, to move portion 698 along axis T2. If a force with a component along axis T3 of substantial magnitude is transmitted to bearing member 680*a*, 680*b*, corresponding wheel 681*a*, 681*b* rotates along guide 690*a*, 690*b* to promote self-alignment of system 600. Notably, self-alignment is promoted despite the nonparallel relationship between arms 620*a*, 620*b*.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for varying space in a vehicle, said system comprising:

an occupiable first section with a number of ground engaging wheels and a first wall connected to a first floor;

an occupiable second section coupled to said first section and configured to move along a first axis from a first position to a second position relative to said first section to adjust volume of an occupiable living space defined by said first and second sections, said second section being occupiable in said first and second positions and having a second wall, a second floor connected to said second wall, and a guide;

a pair of load bearing arms, a first end of each of the load bearing arms being fixedly coupled to said first section and configured to support said second section, each of said arms including a bearing member pivotably mounted thereto distal to the first end thereof, each of said bearing members engaging said guide to move said second section along said first axis, each of said bearing members being permitted to move along a second axis in response to a force component acting perpendicular to said first axis when said second section is moved, said second axis being generally perpendicular to said first axis; and an operator controlled positioning mechanism operatively coupled to said arms to selectively position said arms and correspondingly position said second section relative to said first section.

2. The system of claim 1, wherein said second section includes a pair of opposing walls connected to said second floor and said second wall, said second floor slidingly engaging at least a portion of said first floor.

3. The system of claim 1, wherein said guide includes a rail and each of said bearing members engages said rail during adjustment of said occupiable living space.

4. The system of claim 1, wherein said guide includes a rail and each of said bearing members includes a block slidingly engaging said rail.

5. The system of claim 1, wherein said guide includes a channel defined between a pair of rails along said second axis and each of said bearing members includes a pivotally mounted block slidingly engaging said channel, each of said blocks being at least partially formed from a self-lubricating polymeric material.

6. The system of claim 1, wherein:

said guide includes a channel and each of said bearing members engages said channel; and said arms each has a tube fixed to said first section and a moveable segment at least partially nested within said tube, and said moveable segment is configured to move along said first axis in response to said mechanism.

7. A system for varying space in a vehicle, said system comprising:

a first portion with a number of ground engaging wheels and a first floor connected to a first wall;

a second portion coupled to said first portion and having a second floor connected to a second wall, a first load bearing guide and a second load bearing guide being mounted on said second portion along a first axis, and wherein said first and second guides are each defined by a corresponding portion of an elongate channel defined along said first axis;

a first support arm coupled to said first portion and having a first bearing member engaging said first guide;

a second support arm coupled to said first portion and having a second bearing member engaging said second guide; and an operator controlled actuator configured to selectively position said first and second arms and correspondingly move said second portion relative to said first portion along a second axis with said first and second bearing members to adjust volume of an occupiable living space defined by said first and second portions, said first and second bearing members being configured to move relative to said first axis in response to a force component acting along said first axis during adjustment of said second portion along said second axis, said second axis being generally perpendicular to said first axis.

8. The system of claim 7, wherein said second portion includes a pair of opposing walls joined to said second floor and said second wall, said second portion being at least partially nested within said first portion.

9. The system of claim 7, wherein said first guide includes a rail and said first bearing member includes a pivotally mounted block slidingly engaging said rail during adjustment of said occupiable living space.

10. The system of claim 7, wherein each of said first and second bearing members includes a block slidingly engaging said channel, and said block is at least partially formed from a self-lubricating polymeric material.

11. The system of claim 10, wherein each of said first and second arms has a tube fixed to said first portion and a moveable segment configured to telescopically move relative to said tube thereof along said second axis in response to said actuator.

12. A system for varying space in a vehicle, said system comprising:

an occupiable first portion with a number of ground engaging wheels;

an occupiable second portion coupled to said first portion to define an occupiable living space and configured to move along a first axis from a retracted position to an expanded position relative to said first portion, said second portion being occupiable in said retracted and expanded positions, said second portion including a first load bearing guide and a second load bearing guide;

a first support arm with a first tube fixed to said first portion, and a first movable section at least partially nested within said first tube and configured to move telescopically relative to said first tube along said first axis, said first movable section engaging said second portion in a load bearing relationship, said first arm including a first bearing member engaging said first guide to move said second portion relative to said first portion, said first bearing member being permitted to move relative to a second axis during adjustment of said occupiable living space;

a second support arm coupled to said first portion and configured to movably engage said second portion, said second arm including a second bearing member engaging said second guide to move said second portion relative to said first portion said second bearing member being permitted to move relative to said second axis during adjustment of said occupiable living space; and an operator controlled positioning mechanism, said mechanism including a first rotatable member being configured to rotate about the second axis approximately perpendicular to said first axis and engaging said first movable section to selectively position said first movable section along said first axis and correspondingly position said second portion in relation to said first portion.

13. The system of claim 12, wherein:

said second arm further includes a second tube fixed to said first portion and a second movable section at least partially nested within said second tube and configured to telescopically move relative thereto, said second movable section engaging said second portion in a load bearing relationship; and said mechanism further includes a second rotatable member said second axis and engaging said second movable section to selectively position said second movable section along said first axis and correspondingly position said second portion in relation to said first portion.

14. The system of claim 13, wherein said mechanism further includes an operator control operatively coupled to an electric motor with a shaft, and said shaft is coupled to said first and second rotatable members to selectively turn said first and second rotatable members in response to said operator control.

15. The system of claim 13 wherein the first rotatable member and the second rotatable member are both formed from a self-lubricating polymeric material.

16. The system of claim 12, wherein said first rotatable member includes a number of radial teeth and said first movable section includes a number of apertures spaced along said first axis, said apertures each being configured for load bearing engagement by at least one of said teeth.

17. The system of claim 12, wherein said first rotatable member is formed from ultra-high-molecular-weight polyethylene.

18. The system of claim 12, wherein said first portion has a first floor with a first load bearing surface, said second portion has a second floor with a second load bearing surface, said first floor slidingly engages said second floor, and at least one of said first and second load bearing surfaces is formed from a self-lubricating polymeric material.

19. The system of claim 12, wherein:

said second arm includes a second tube fixed to said first portion and a second movable section at least partially nested within said second tube and configured to telescopically move along said first axis in relation to said second tube, said second movable section engaging said second portion in a load bearing relationship;

said mechanism further includes a second rotatable member being generally configured to rotate about said second axis and engaging said second movable section to selectively position said second movable section along said first axis and correspondingly position said second portion in relation to said first portion; and said mechanism further includes an operator control operatively coupled to an electric motor with a shaft, and said shaft is coupled to said first and second rotatable members to selectively turn said first and second rotatable members in response to said operator control.

20. The system of claim 12 wherein the first and second bearing members are formed from a self-lubricating polymeric material.

* * * * *

UNITED STATES PATENT AND TRADEMARK OFFICE
CERTIFICATE OF CORRECTION

PATENT NO. : 5,915,774
DATED : June 29, 1999
INVENTOR(S) : R.L. Tiedge

It is certified that error appears in the above-identified patent and that said Letters Patent is hereby corrected as shown below:

| COLUMN | LINE | |
|---|---|---|
| 17 (Claim 12, | 58 line 28) | After "first portion" insert --,-- |
| 18 (Claim 13, | 12-13 lines 8-9) | After "member" insert --being generally configured to rotate about-- |
| 18 (Claim 19, | 41 line 2) | After "second arm" insert --further-- |

Signed and Sealed this

Twenty-eighth Day of December, 1999

Attest:

Q. TODD DICKINSON

*Attesting Officer*  *Acting Commissioner of Patents and Trademarks*